United States Patent
Schwalb

(10) Patent No.: US 12,450,626 B2
(45) Date of Patent: Oct. 21, 2025

(54) AUTOMATED ACTIONABLE INSIGHT RECOMMENDATIONS

(71) Applicant: Expedia, Inc., Seattle, WA (US)

(72) Inventor: Edward Moshe Schwalb, Irvine, CA (US)

(73) Assignee: Expedia, Inc., Seattle, WA (US)

( * ) Notice: Subject to any disclaimer, the term of this patent is extended or adjusted under 35 U.S.C. 154(b) by 0 days.

(21) Appl. No.: 18/480,926

(22) Filed: Oct. 4, 2023

(65) Prior Publication Data

US 2025/0117824 A1   Apr. 10, 2025

(51) Int. Cl.
| | |
|---|---|
| G06Q 30/02 | (2023.01) |
| G06F 3/0482 | (2013.01) |
| G06F 3/0484 | (2022.01) |
| G06Q 30/0242 | (2023.01) |

(52) U.S. Cl.
CPC ....... *G06Q 30/0244* (2013.01); *G06F 3/0482* (2013.01); *G06F 3/0484* (2013.01); *G06Q 30/0246* (2013.01)

(58) Field of Classification Search
CPC ........... G06Q 30/0244; G06Q 30/0246; G06Q 30/0254; G06Q 10/067; G06Q 30/02; G06Q 30/0207; G06F 3/0482; G06F 3/0484
See application file for complete search history.

(56) References Cited

U.S. PATENT DOCUMENTS

| | | | |
|---|---|---|---|
| 7,899,710 B1 * | 3/2011 | Walker .............. | G06Q 30/0224 705/26.7 |
| 8,600,805 B2 * | 12/2013 | Wallace ................ | G06Q 50/14 705/5 |
| 10,320,633 B1 * | 6/2019 | Wong .................. | H04L 67/535 |

(Continued)

FOREIGN PATENT DOCUMENTS

| | | |
|---|---|---|
| CA | 2 864 834 A1 | 10/2013 |
| WO | WO 2023/187717 A1 * | 10/2013 ............. G06Q 10/04 |

OTHER PUBLICATIONS

Lei Deng; Jerry Gao; Chandrasekar Vuppalapati, Building a Big data Service Framework for mobile Advertising (English), 2015 IEEE First International Conference on Big Data Computing Service and Applications(2015, pp. 256-266), Mar. 1, 2015 (Year: 2015).*

(Continued)

*Primary Examiner* — Marilyn G Macasiano
(74) *Attorney, Agent, or Firm* — Davis Wright Tremaine LLP

(57) ABSTRACT

Systems and methods of recommending insights to optimize an experience. In some implementations, a request is received to optimize an experience based on a display option of a plurality of display options, one or more filters, and/or one or more metrics. Based on the request, the systems and methods can access (e.g., from a sampled data set) metric data associated with each of the display options. Metric data corresponding to each display options can be compared to (Continued)

generate insights based on each comparison. The systems and methods can determine whether an insight corresponds to a positive improvement and rank the insights based on preconfigured criteria. In addition, insights can be implemented automatically and/or recommended to a user in order to optimize the experience (e.g., based on the one or more metrics).

20 Claims, 7 Drawing Sheets

(56) References Cited

U.S. PATENT DOCUMENTS

| | | | |
|---|---|---|---|
| 11,281,563 B2 * | 3/2022 | Ma | G06F 11/3698 |
| 11,768,840 B2 * | 9/2023 | White | G06F 16/2471 |
| | | | 707/723 |
| 12,165,193 B2 * | 12/2024 | Garvey | G06Q 30/0201 |
| 2003/0036930 A1 * | 2/2003 | Matos | G06Q 30/02 |
| | | | 705/5 |
| 2003/0050865 A1 * | 3/2003 | Dutta | G06Q 30/02 |
| | | | 705/26.61 |
| 2007/0027751 A1 | 2/2007 | Carson et al. | |
| 2009/0138362 A1 | 5/2009 | Schroedl et al. | |
| 2012/0136683 A1 | 5/2012 | Wallace et al. | |
| 2013/0211927 A1 | 8/2013 | Kellogg et al. | |
| 2021/0042864 A1 * | 2/2021 | Badino | G06Q 30/0201 |
| 2024/0370898 A1 * | 11/2024 | Vakil | G06Q 30/0269 |

OTHER PUBLICATIONS

International Search Report and Written Opinion dated Dec. 5, 2024 in Application No. PCT/US2024/049810, 16 pages.

* cited by examiner

| Baseline_Value | Improved_Value | Metric | Metric_baseline | Metric_improved | Improvement | Count | Segment_Field1 | Segment_Value1 | Segment_Field2 | Segment_Value2 | Segment_Field3 |
|---|---|---|---|---|---|---|---|---|---|---|---|
| Recommended | Price | Click_count | 0.000 | 0.016 | 15.739 | 2605 | Child_count | 0 | Country_code | ITA | Marketing_cc |
| Recommended | Price | Order_count | 0.012 | 0.033 | 1.728 | 1590 | Brand_group | Bexg | Child_count | 0 | Device |
| Recommended | Price | Order_count | 0.011 | 0.032 | 1.699 | 1799 | Experience_type | Native App | Filter_count | 0 | Infant_count |
| Recommended | Price | Order_count | 0.011 | 0.031 | 1.621 | 1865 | Brand_group | Bexg | Device | App | Filter_count |
| Recommended | Price | Order_count | 0.011 | 0.031 | 1.621 | 1865 | Device_type | Mobile | Experience_t | Native App | Filter_count |
| Recommended | Price | Order_count | 0.012 | 0.033 | 1.552 | 1556 | Country_code | USA | Experience_t | Native App | Filter_count |
| Recommended | Distance | Order_count | 0.014 | 0.035 | 1.456 | 1228 | Brand_name | Brand Expedia | Child_count | 0 | Experience_t |
| Recommended | Price | Click_count | 0.199 | 0.484 | 1.424 | 1018 | Device | App | Literal_lt_ma | Direct | Member_tier |
| Recommended | Price | Order_count | 0.011 | 0.029 | 1.417 | 1112 | Brand_name | Brand Expedia | Experience_t | Native App | Filter_count |
| Recommended | Price | Click_count | 0.378 | 0.900 | 1.381 | 2482 | Experience_type | Native App | Traveller_type | New | |
| Recommended | Price | Click_count | 0.378 | 0.900 | 1.381 | 2482 | Experience_type | Native App | Traveller_type | New | |
| Recommended | Distance | Order_count | 0.016 | 0.039 | 1.374 | 1035 | Country_code | USA | Destination_r | AMER | Experience_t |
| Recommended | Distance | Order_count | 0.016 | 0.039 | 1.374 | 1035 | Country_code | USA | Destination_r | AMER | Experience_t |
| Recommended | Distance | Order_count | 0.015 | 0.037 | 1.373 | 1119 | Country_name | United States of America | Device | App | Filter_count |
| Recommended | Distance | Order_count | 0.013 | 0.033 | 1.354 | 1376 | Experience_type | Native App | Filter_count | 0 | |
| Recommended | Price | Click_count | 0.361 | 0.819 | 1.262 | 2233 | Brand_group | Bexg | Brand_name | Brand Expedia | Country_nam |
| Recommended | Price | Click_count | 0.366 | 0.829 | 1.260 | 2797 | Child_count | 0 | Experience_t | Native App | Line_of_busir |
| Recommended | Price | Click_median | 12.051 | 26.752 | 1.220 | 3184 | Filter_count | 0 | Party_size | 2 | |
| Recommended | Price | Click_median | 12.051 | 26.752 | 1.220 | 3184 | Filter_count | 0 | Party_size | 2 | |

FIG. 5

AUTOMATED ACTIONABLE INSIGHT RECOMMENDATIONS

BACKGROUND

Websites, mobile applications, and other experience interfaces are updated periodically to provide new layouts and features to improve consumer experiences. In some cases, developers and UI/UX designers may utilize consumer data metrics, such as a conversion rate (CVR), a click-through rate (CTR), etc., in determining future experiences to implement. For example, metric data pertaining to a CTR of an advertisement (number of clicks on the advertisement divided by the number of times the advertisement is shown) may inform a developer of how successful an advertisement may be. Accordingly, the developer may choose to manually try different advertising strategies in order to improve the CTR for the advertisement.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

FIG. 5 is a table depicting example extracted metric data generated within the insight recommendation system, according to various aspects of the present disclosure;

DETAILED DESCRIPTION

Figure 1:
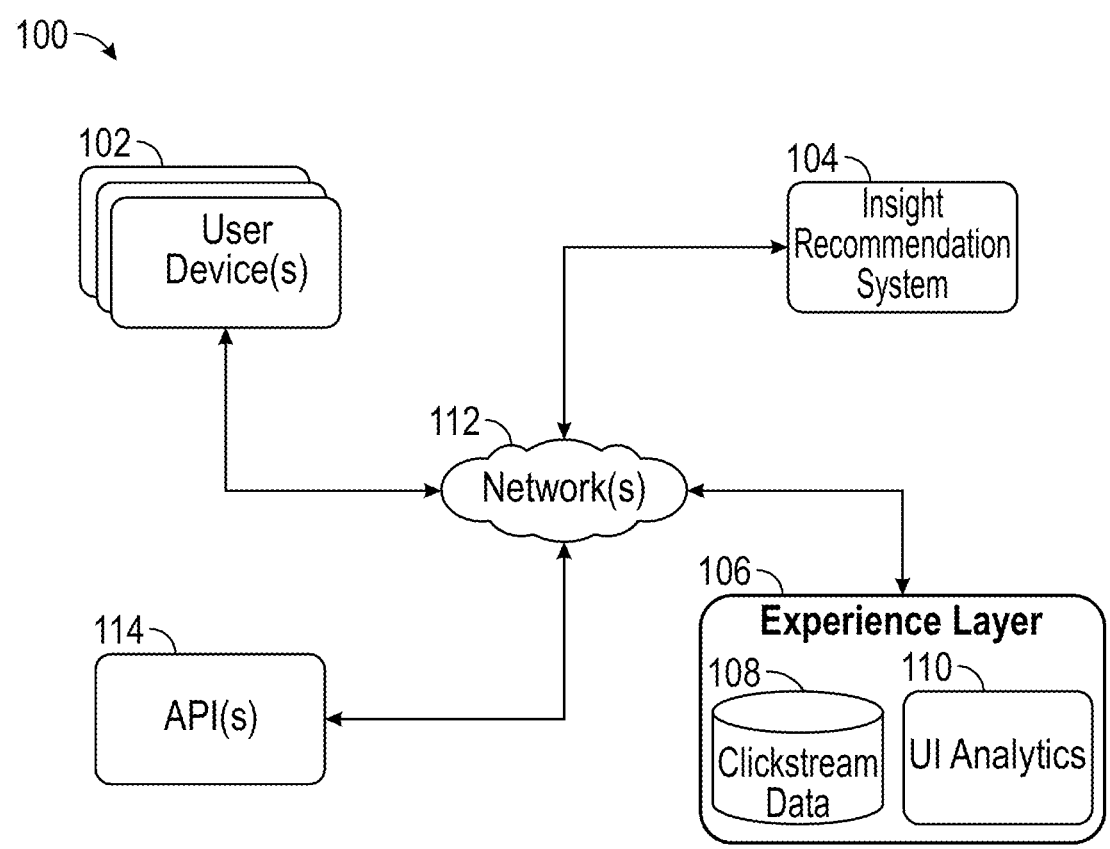
FIG. 1 is a schematic block diagram of an example network environment in which an insight recommendation system may operate, according to various aspects of the present disclosure.

Aspects of the present disclosure relate to improving user experiences by recommending actionable insights based on one or more target metrics or strategies. In the context of travel, users of travel-booking or travel-related services may interact with a number of platforms that include various user interfaces or "experiences." In some implementations, travel-related services can include any service(s) related to lodging, hotels, flights, car rentals, activities, itineraries, scheduling, tickets, tourism, translation, restaurants, shopping, and the like.

In the context of data and analytics, an insight refers to an analyst or other business user discovering a pattern in data or a relationship between variables that was not previously known. Insights relating to travel-booking or travel-related services may relate to the discovery of relationships between certain consumer patterns and/or behaviors (e.g., metrics) and service experience display options. Display options can include any feature related to an experience, such as user interface features within an experience (e.g., sort type of selectable listings or services, placement of advertisements or other related content, amenities filter, or the like). In addition, display options can include a parameter or configuration associated with the experience, such as relating to a service within the experience. In some examples, a service includes a search service, a lookup service, an advertisement content service, or any other similar service.

A metric is any type of quantitative measurement of user behavior (e.g., associated with an experience) and include any user interaction with any portion of a user interface or an experience. Experiences across a variety of platforms (e.g., web browser, mobile application) may vary depending on interface layout, advertisement placement, search result sorting, or the like. In addition, metrics across all platforms may vary widely. For example, metrics can include measurements corresponding to a click count (e.g., on a specific feature, element in a user interface, or the like), a conversion rate (CVR), a click-through rate (CTR), or the like. In some examples, metrics are utilized by an insight recommendation system to recommend one or more insights or actions that, if implemented, is predicted to improve an experience (e.g., in the context of a selected metric). There is a desire to automatically discover high quality insights, having significant impact. Given such insights, developers may be tasked with updating a particular experience according to one or more metrics. For example, a developers may be tasked with implementing changes recommended by an insight for improving a CVR metric associated with an advertisement placed on a website to determine an optimal advertisement placement (which may be in a new location on the website) in order to improve the CVR metric.

In some embodiments, for example, insights can be automatically integrated into existing software systems to overcome the challenge of manual programming of enhancements in large software systems without breaking their existing functionality. In this example, developers are tasked with construction of a lookup table, or an index, which can determine the most relevant insight for every incoming request. Subsequently, the selected insight is used to determine adjustment to the system configuration to optimize it operation to the incoming request.

In some embodiments, for example, an objective may be entered into the actionable insight recommendation system as a request to optimize a first advertisement based on CVR and the request may also include other metrics and filtering criteria. In this example, clickstream data pertaining to CVR of the first advertisement placed at two separate locations on the website experience may be collected. However, due to the constant influx of consumer data (e.g., clickstream data), the varying nature of consumer demand, and consumer sentiment, the "optimal" display option for experiences is subject to change. A system that can adapt to the change and recommend insights based on large volumes of data can ensure that experience strategies are adapted and adjusted accordingly. In addition, in some cases, one or more calculated insights may not result in improvements to an indicated objective or indicated metric(s) and may even result in a decrease or reduction in the metric being optimized for. Therefore, in order to ensure a recommended insight is optimal, the insight recommendation system parses through a multitude of potential insights across numerous platforms, experiences, and options. However, parsing through so many iterations requires a large amount of computing resources.

Indeed, clickstream data across the numerous platforms and experiences accumulates exponentially. For example, a search service on a travel-booking website may query thousands of search requests per day and handle a great number of transactions. This "big data" may encompass metric data for every request, click, or interaction with an experience across various platforms. In addition, big data may be logged and stored in servers and/or other databases in the form of tables, vectors, and the like. However, to implement an insight recommendation system based on the big data would require a great amount of time and processing power.

So, to conserve resources and cut down on processing time, the actionable insight recommendation system may access metric data sampled from the big data. To sample the big data, the insight recommendation system may store a representative portion of the total clickstream data into a small data store. For example, given a particular big data table storing metric data pertaining to a variety of experiences, a sampled small data set may include one row of the table to capture a representative snapshot of metric data across all experiences. In another example, sampled data may be curated by a user, such as for recommending insights related to a particular experience or event. For example, a user may desire to optimize the website search result experience for holiday travels. In this case, the insight recommendation system may sample clickstream data from the website specifically around the holiday dates from the current year or prior years, etc. In another embodiment, the insight recommendation system may access data that has been sampled and stored in a data store. Insights may then be verified against larger consumer datasets to ensure that the insights will result in experience improvements.

To determine an insight, the insight recommendation system may utilize the data for a comparison between display options. The metric data corresponding to a current (or base line) display option may be compared to the metric data of a different display option. This may inform the insight recommendation system of an insight corresponding to the optimal display option based on the metric data. For example, the insight recommendation system may receive a request to optimize the display option of an advertisement on a website based on CVR. The insight recommendation system may sample or otherwise access data pertaining to CVR metric data of the website for the advertisement placed at the top of the website and at the bottom of the website. In addition, the insight recommendation may compare the CVR data. A higher CVR on the advertisement that is placed near the top of a website compared to a lower CVR on the same advertisement placed at the bottom of the website may output an insight related to the optimal location for the advertisement to be at the top of the website. Although this is one comparison between two display options, multiple comparisons between a base line display option and other display options may be performed. In addition, insights generated from comparisons may be further analyzed. For example, insights may be grouped by whether or not they result in an improved metric if implemented. Insights may also be ranked, such as by amount of metric improvement, etc. Accordingly, this insight may be implemented by the developer or implemented automatically by the system. As noted above, one or more metrics or dimensions may be used to recommend insights. Hence, the insight recommendation system may recommend a plurality of insights across experiences and platforms.

I. Example Network and/or Operating Environment

FIG. 1 is a schematic block diagram of an example network environment 100 in which an insight recommendation system may operate, according to various aspects of the present disclosure. In some implementation, the network environment 100 may be configured to receive queries for insight recommendations, and provide insights based on data relating to an experience layer. The network environment 100 includes user device(s) 102, insight recommendation system 104, experience layer 106, API(s) 114, all in communication with each other through network 112. The insight recommendation system 104 can include various hardware components and software components and can provide functionality as described further herein.

In various aspects, communications among the various components of the example network environment 100 may be accomplished via any suitable device, systems, methods, and/or the like. For example, the insight recommendation system 104 may communicate with the user device(s) 102, the experience layer 106, and/or the API(s) 114 via any combination of the network 112 or any other wired or wireless communications networks, method (e.g., Bluetooth, WiFi, infrared, cellular, and/or the like), and/or any combination of the foregoing or the like. As further described below, network 112 may comprise, for example, one or more internal or external networks, the Internet, and/or the like.

Further details and examples regarding the implementations, operation, and functionality of the various components of the insight recommendation system 104 and the example network environment 100 are described herein in reference to various figures.

a. Network

The network 112 can include any appropriate network, including wired network, wireless network, or combination thereof. For example, network 112 may be a personal area network, local area network, wide area network, cable network, satellite network, cellular network, or any other such network or combination thereof. As a further example, the network 112 may be a publicly accessible network of linked networks, possibly operated by various distinct parties, such as the Internet. Protocols and components for communicating via the Internet or any other types of communication networks are known to those skilled in the art of computer communications and thus, need not be described in more detail herein. In various embodiments, the network 112 may be a private or semi-private network, such as a corporate or university intranet. The network 112 may include one or more wireless networks, such as a Global System for Mobile Communications (GSM) network, a Code Division Multiple Access (CDMA) network, a Long-Term Evolution (LTE) network, C-band, mmWave, sub-6 GHz, or any other type of wireless network. The network 112 can use protocols and components for communicating via the Internet or any of the other aforementioned types of networks. For example, the protocols used by the network 112 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art of computer communications and thus, need not be described in more detail herein.

In various implementations, the network 112 can represent a network that may be local to a particular organization, e.g., a private or semi-private network, such as a corporate or university intranet. In some implementations, devices (e.g., insight recommendation system 104, user device(s) 102, and/or the like) may communicate via the network 112 without traversing an external network, such as the Internet. In some implementations, devices connected via the network 112 may be walled off from accessing the Internet. As an example, the network 112 may not be connected to the Internet. Accordingly, e.g., the user device(s) 102 may communicate with the insight recommendation system 104 directly (via wired or wireless communications) or via the network 112, without using the Internet. Thus, even if the network 112 or the Internet is down, the insight recommendation system 104 may continue to communicate and function via direct communications (and/or via the network 112).

b. Example User Devices

User device(s) 102 illustratively correspond to any computing device that provides a means for a user or admin to interact with components of network environment 100 (e.g., insight recommendation system 104, experience layer 106, API(s) 114, or the like). For example, a user, with user device(s) 102, may submit a query for an insight recommendation to the insight recommendation system 104, and/or interact with experiences in the experience layer 106. In some examples, the experience layer 106 may be implemented on device(s) 102. Of course, other activities may also be performed by a user with a user device(s) 102. User devices 102 may include user interfaces or dashboards that connect a user with a machine, system, or device. In various implementations, user device(s) 102 include computer devices with a display and a mechanism for user input (e.g., mouse, keyboard, voice recognition, touch screen, and/or the like). In various implementations, the user device(s) 102 include desktops, tablets, e-readers, servers, wearable device, laptops, smartphones, computers, gaming consoles, and the like. In some implementations, user device(s) 102 can access a cloud provider network via the network 112 to view or manage their data and computing resources, as well as to use websites and/or applications hosted by the cloud provider network. Elements of the cloud provider network may also act as clients to other elements of that network. Thus, user device(s) 102 can generally refer to any device accessing a network-accessible service as a client of that service.

c. Experience Layer

The experience layer 106 may be any user-facing interface or platform through which a user of user device(s) 102 may access and interact with travel-booking services. In some implementations, the experience layer 106 may be configured to render an "experience" on a user device(s) 102 that a user may interact with to access the travel-booking services. For example, the experience layer 106 may include a website on a browser, a mobile application, a tablet application, and the like. The experience layer 106 may provide access to a range of travel-booking services, such as a search service for flights, hotels, lodging, car rentals, cruises, and other travel-related services, providing recommendations, creating itineraries, etc. In some cases, the experience layer 106 may contain advertisements, links, and other promotional content that is embedded within the experience layer 106 for users to interact with. In addition, embedded content and/or links to third-party websites or services may be included within the experience layer 106.

In some implementations, the experience provided by the experience layer 106 may vary depending on the user device(s) 102. For example, a website experience on a laptop (via a web browser, etc.) may be different from the same website opened on a browser of a mobile device. In this example, although the content of the website may be the same between both experiences, the layout of the content of the website may vary between the devices.

As shown in FIG. 1, experience layer 106 may include clickstream data 108 and user interface (UI) analytics 110.

Clickstream data 108 illustratively includes any information collected about a user interacting with an experience. In some implementations, clickstream data 108 may include a log of user activity with a particular experience. For example, clickstream data 108 related to a travel-booking website experience may include a list of webpages visited, time spent on each page, click locations, click counts, search strings, and the like.

In some implementations clickstream data 108 may be broken down into metrics and dimensions. Dimensions may include any experience attribute, such as a qualitative characteristic related to a travel-booking or related service interface within the experience. For example, dimensions may include a device type, an experience type (e.g., native app, mobile app, tablet app, website, browser, or the like), a marketing code, a marketing channel, a member tier category, a destination name, a destination shorthand, a destination type, a destination attribution, a destination region, a country code, a country name, a brand group, a brand name, a line of business (ex. A home page versus a lodging page), a sort type, a traveler type, a travel group type, a room type, a search end, a trip duration, an adult count, a child count, an infant count, a party size, a room count, a dimension count, a typeahead character count, a typeahead origin, a typeahead character, and the like. A metric can include any quantitative measurement relating to an experience. For example, in the context of a search service, metrics can include a price detail product count, a rate plan view count, a review view count, a count relating to opening a property image gallery, or the like. Metrics can also include an order count, a booking count, a purchase button count, a purchase button product count, or the like. In some implementations, metrics relate to a user's propensity for certain actions within the experience, such as a top ten click percentage, a top ten booking percentage, an indicator whether a user has or has not clicked, an indicator whether a user has or has not booked, a top ten click count, a top ten booking, an indicator whether a destination has been changed, an indicator whether a trip duration has changed, an indicator whether a date has changed, an indicator whether a party size has changed, an indicator whether a room count has changed, or the like. In some implementations, metrics relate to a user's engagement level, such as a click count (CTR), a scroll count, a view count, a gallery open count, a like count, a favorite count, a view duration, a percentage of clicks in top ten positions, a percentage of orders from top ten position, a quality of reviews for top ten positions, an inspection of detailed images for top ten positions, a number of bounces, a page duration, a duration of review for top ten positions, or the like. Metrics may also include values and/or data related to affiliate marketing (AFF), brand awareness (BRA), direct marketing, traffic, or booking (DIRECT), email marketing (EML), inbound marketing (ICM), marketing data platform (MDP).

In some implementations, clickstream data 108 may be accessible through one or more online services (e.g., website(s), application(s), API(s), or the like) such as via network 112. In some implementations, the clickstream data 108 can be stored on multiple computing systems. In some implementations, the clickstream data 108 can be stored on one or more remote servers and accessible via network 112. In some implementations, the clickstream data 108 may be stored on one or more servers in multiple locations and accessible via network 112. In some implementations, the clickstream data 108 can be stored within database(s) within multiple servers, and accessible via network 112.

In some implementations, analytics display 110 can be any user-facing interface or platform, such as a graphical user interface (GUI), through which a user of user device(s) 102 may access and interact with the insight recommendation system 104. In some implementations, analytics display 110 may be a portal or other interface through which a user may access components of insight recommendation system 104. For example, a user may, through the analytics display 110, input a request to optimize a service, such as a booking or travel-related service. In some implementations, a user may, through the analytics display 110, desire to optimize a service based on a metric. In some implementations, a request to optimize the service may include a text-based question, such as "What improves CTR for Returning Traveler?" In some implementations, results from the insight recommendation system 104 may be displayed within an interface of the analytics display 110. For example, all insight recommendations may be displayed within the interface of the analytics display 110, such as in a list form. In some implementations, recommended insights may be filtered by the insight recommendation system 104 before being displayed in the interface of the analytics display 110. In addition, recommended insights may be ranked, ordered, or otherwise organized in the analytics display 110.

d. Insight Recommendation System

Within network environment 100, the insight recommendation system 104 operates to improve user experiences by recommending insights based on one or more target metrics or strategies. In some implementations, the insight recommendation system 104 may utilize metrics to recommend one or more insights or actions that, if implemented, may improve an experience (e.g., in the context of a selected metric) in the experience layer 106.

In some implementations, the insight recommendation system 104 can be implemented on a cloud provider network (e.g., that can be accessed by user device(s) 102 over a network 112). A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts. The cloud provider network can include sets of host computing devices, where each set can represent a logical group of devices, such as a physical "rack" of devices. Each computing device can support one or more hosted machine instances that may be virtual machine instances, representing virtualized hardware supporting, e.g., an operating system and applications. Hosted machine instances may further represent "bare metal" instances, whereby a portion of the computing resources of the computing device directly support (without virtualization) the machine instance. In some cases, a machine instance may be created and maintained on behalf of a client. For example, a client may utilize a client computing device to request creation of a machine instance executing client-defined software. In other cases, machine instances may implement functionality of the cloud provider network itself. For example, machine instances may correspond to block storage servers, object storage servers, or compute servers that in term provide block storage, object storage, or compute, respectively, to client computing devices. While block storage, object storage, and compute are example services, machine instances can additionally or alternatively represent domain name services ("DNS") servers, relational database servers, servers providing serverless computing services, and other server services for supporting on-demand cloud computing platforms. Each host computing device includes hardware computer memory and/or processors, an operating system that provides executable program instructions for the general administration and operation of that server, and a computer-readable medium storing instructions that, when executed by a processor of the server, allow the server to perform its intended functions. Furthermore, the cloud provider network may include other computing devices facilitating operation of the host computing devices, such as data stores to store account information, computing devices to implement logging, monitoring, and billing services, etc.

In some implementations, the cloud provider network can provide on-demand, scalable computing platforms to users through the network 112, for example allowing users to have at their disposal scalable "virtual computing devices" via their use instances or services provided by such instances. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

e. API(s)

As shown in FIG. 1, network environment 100 may include application programming interfaces (APIs) 114. In some implementations, APIs may include any software or component configured to connect programs or services within the network environment 100. For example, insight recommendation system 104 may communicate with third party servers and/or third-party services via APIs 114 to supplement, enrich, process, or otherwise improve data used, recommendations generated, or insights generated by the insight recommendation system. In some implementations, an API service can be provided by the insight recommendation system to third parties so that the third parties can access the insight recommendation system through the API service.

II. Insight Recommendation System

Figure 2:
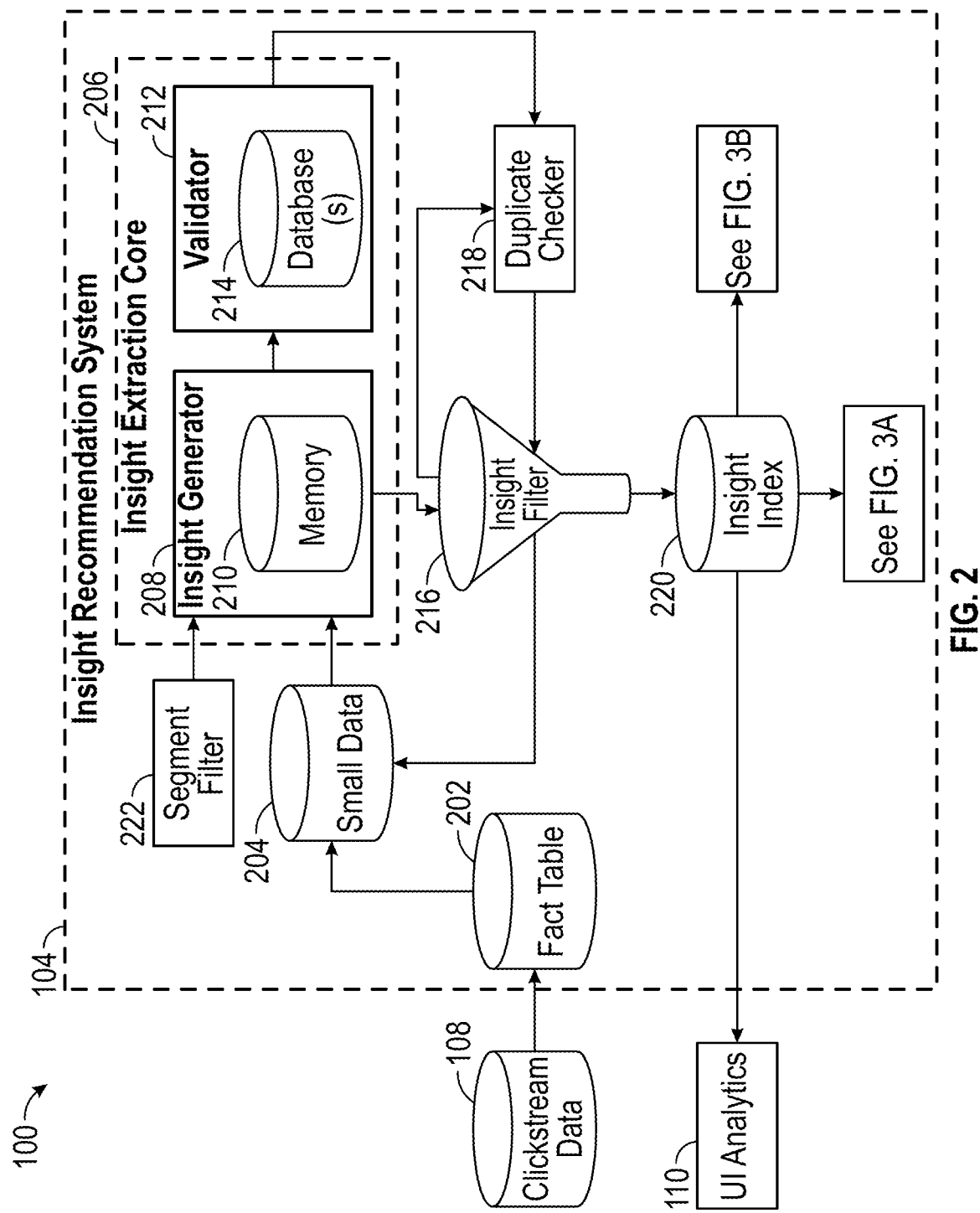
FIG. 2 is a block diagram of an example data flow and block diagram in which the insight recommendation system may operate, according to various aspects of the present disclosure.

FIG. 2 is a block diagram of an example data flow and block diagram in which the insight recommendation system 104 may operate, according to various aspects of the present disclosure. Each of the insight recommendation system 104 and/or one or more of the corresponding subcomponents described can be implemented as part of the insight recommendation system 104 or as distinct systems (e.g., on one or more computing systems with one or more processors and one or more memories) or as part of other systems that implement one or more of the subcomponents (e.g., and potentially other subcomponents or systems not described herein).

The insight recommendation system 104 may include one or more of the following components: fact table 202, small data 204, insight extraction core 206, insight funnel 216, duplicate checker 218, and insight index 220.

In some implementations, the insight recommendation system 104 generates and/or recommends insights based on clickstream data 108. For example, insight recommendation system 104 may access clickstream data 108 from the experience layer 106 (e.g., as captured from one or more interactions by users with pages of a website) via any combination of the network 112 or any other wired or wireless communications networks, method (e.g., Bluetooth, WiFi, infrared, cellular, and/or the like), and/or any combination of the foregoing or the like. In some implementations, the insight recommendation system 104 may continuously access data from the clickstream data 108. In some implementations, the insight recommendation system 104 may pull data from the clickstream data 108 at various intervals. In some implementation, information and/or data from the clickstream data 108 may be stored in fact table 202. In some implementations, the fact table 202 can be stored on multiple computing systems. In some implementations, the fact table 202 can be stored on one or more remote servers and accessible via network 112. In some implementations, the fact table 202 can be stored on one or more servers in multiple locations and accessible via network 112. In some implementations, the fact table 202 can be stored within database(s) within multiple servers, and accessible via network 112. In some implementations, the fact table 202 can be stored on one computing system.

As noted herein, clickstream data 108 illustratively includes information collected about a user, or from a user, based on the user interacting with an experience. In some implementations, clickstream data 108 may include a log of user activity with a particular experience. For example, clickstream data 108 related to a travel-booking website experience may include a list of webpages visited, time spent on each page, click locations, click counts, search strings, scrolling patterns, and the like.

In some implementations, at least a portion of the clickstream data 108 may be stored in fact table 202 such as with additional metrics and dimensions. Dimensions may include any experience attribute, such as a qualitative characteristic related to a travel-booking or related service interface within the experience. In some implementations, dimensions may be related to a display option within an experience, such as the layout of search results (e.g., "sort type. Display options can include any feature related to an experience, such as user interface features within an experience (e.g., sort type of selectable listings or services, placement of advertisements or other related content, amenities filter, or the like). In addition, display options can include a parameter or configuration associated with the experience, such as relating to a service within the experience. In some examples, a service includes a search service, a lookup service, an advertisement content service, or any other similar service. For example, dimensions may include a device type, which may include the type of any user device(s) 102, such as a laptop, tablet, a phone (or mobile). An experience type dimension may include the type of interface that an experience is rendered on, such as a native application ("native app"), mobile application ("mobile app"), etc. Dimensions may also include attributes related to information related to a user or traveler, such as a member tier category, a traveler type (e.g., new, returning), a travel group type.

In some implementations, dimensions, or filters, may include attributes related to information tied to a particular service within an experience, such as a search service. With respect to search services, for example, dimensions may include information entered into a booking query or other search query. For example, a destination name, a destination shorthand or abbreviation, a country code, a country name, a destination type, a destination attribution, a destination region, a country, or the like. In some implementations, dimensions may include a marketing code, a marketing channel, a member tier category, a destination name, a destination shorthand, a destination type, a destination attribution, a destination region, a country code, a country name, a brand group, a brand name, a line of business (ex. A home page versus a lodging page), a sort type, a traveler type, a travel group type, a room type, a search end, a trip duration, an adult count, a child count, an infant count, a party size, a room count, a dimension count, a typeahead character count, a typeahead origin, a typeahead character, and the like.

In some implementations, a metric can include any quantitative measurement relating to an experience. For example, in the context of a search service, metrics can include a price detail product count, a rate plan view count, a review view count, a count relating to opening a property image gallery, or the like. Metrics can also include an order count, a booking count, a purchase button click count, count of products in a purchase, or the like. In some implementations, metrics relate to a user's propensity for certain actions within the experience, such as a top ten click percentage, a top ten booking percentage, an indicator whether a user has or has not clicked, an indicator whether a user has or has not booked, a top ten click count, a top ten booking, an indicator whether a destination has been changed, an indicator whether a trip duration has changed, an indicator whether a date has changed, an indicator whether a party size has changed, an indicator whether a room count has changed, or the like. In some implementations, metrics relate to a user's engagement level, such as a click count (CTR), a scroll count, a view count, a gallery open count, a like count, a favorite count, a view duration, a percentage of clicks in top ten positions, a percentage of orders from top ten position, a quality of reviews for top ten positions, an inspection of detailed images for top ten positions, a number of bounces, a page duration, a duration of review for top ten positions, etc. In some implementations, metrics may relate to a dimension. Metrics may also include values and/or data related to affiliate marketing (AFF), brand awareness (BRA), direct marketing, traffic, or booking (DIRECT), email marketing (EML), inbound marketing (ICM), marketing data platform (MDP). Specifically, various metrics relating to one dimension may be logged and stored in fact table 202 as a row of the table. For example, the fact table 202 can store information relating to a conversion rate of a specific advertisement on a mobile app. In this example, the dimension (or filter) is experience type, such as the mobile app, and the related metric would be the conversion rate of the advertisement. This may be stored in a row of the fact table 202.

In some implementations, insight recommendation system 104 may store sampled clickstream data 108 (and/or including dimensions or metrics from the fact table 202) in the small data 204 store. In some implementations, the small data 204 can be stored on one computing system. In some implementations, the small data 204 can be stored on multiple computing systems. In some implementations, small data 204 may be stored on one or more remote servers and accessible via network 112. In some implementations, the sampled clickstream data 108 can be stored in random access memory (RAM).

In some implementations, the insight recommendation system 104 may sample the clickstream data 108 (also referred to herein as "big data" or "big data store") from fact table 202 to be stored in small data store 204. To sample the data stored in the fact table 202, the insight recommendation system 104 may store a representative portion of the total data comprised within the fact table 202 into the small data 204 store. For example, given the fact table 202 storing metric data pertaining to a variety of experiences, a sampled small data set may include one or more rows and/or one or more columns from the fact table 202 to capture a representative snapshot of metric data across all experiences in addition to one or more rows and/or one or more columns from the clickstream data 108. This can, in an example, include sampling conversion metric data across all device types and sort types. In another example, sampled data may be curated by a user or administrator of the insight recommendation system 104, such as in the case when sampled data is needed for recommending insights related to a particular experience or event (e.g., period of time associated with a holiday, or the like). For example, a user may desire to optimize website search result experience for holiday travel. In this case, the insight recommendation system 104 may sample data from fact table 202 that is logged specifically around the holiday dates from the current year or prior years, or the like.

In some implementations, the insight recommendation system may access data that has been sampled and stored in the small data 204 store. For example, the small data 204 store may store data from fact table 202 or clickstream data 108 that has already been sampled and/or curated for the purpose of insight recommendation. In some implementations, different sampling techniques can be used based on a desired outcome or goal, such as to improve CVR or another metric. In some implementations, the small data store 204 can be stored in random access memory (RAM).

In some implementations, the insight recommendation system 104 can receive a request to optimize an experience based on one or more metrics so that the one or more metrics are maximized for a particular experience. For example, a user or administrator using the insight recommendation system 104 (e.g., through the analytics display 110) can work to optimize an experience based on a first metric such as CVR. In some implementations, the request can include one or more of: a dimension, a display option, and one or more metrics. The dimension, for example, can define certain dimensions, to which corresponding metric data will be analyzed to recommend insights. For example, a user may desire to improve a conversion rate (CVR) related to a search result sort type on a native application on a mobile phone. In this example, the dimensions would include "experience_type=native app" and "device_type=mobile." In this example, the metric is the conversion rate. Also, in this example, the display option can be any feature relating to an experience, such as any configuration, dimension, feature, etc. of an experience. In the case above, the display option is the search result sort type. In some implementations, the request may include more than one metric, dimensions, and/or display options. For example, a similar request can include a query to optimize a CVR related to a search result sort type on a native application on a mobile phone for returning users. This request can filter the request by both querying CVR metric data for users based on the mobile native app and for returning users only. In some implementations, the request to optimize the service may include a text-based question or query. In the example above, the corresponding text-based question may include "What is the best sort type for displaying search results?" In some implementations, the request can include selections, such as from a drop-down menu or other interface menu display, a query from a third party, and the like.

The insight extraction core 206 can be configured to generate and validate insights within the insight recommendation system 104. In some implementations, the insight extraction core 206 includes an insight generator 208 and a validator 212.

The insight generator 208 can be configured to generate insights based on the request to optimize and/or clickstream data. As shown in FIG. 2, the insight generator 208 can access and/or receive the small data 204 and request 222. In some implementations, the request includes the dimension and the one or more metrics, such as in a text-based query. In some implementations, the insight generator 208 receives the request (e.g., including the filter and/or the one or more metrics) and data from the small data 204 store (e.g., comprising some portion of the clickstream data 108 and/or fact table 202 data).

In some implementations, memory 210 of the insight generator 208 can include RAM, ROM, or other persistent or non-transitory memory or storage medium. In some implementations, memory 210 may store data from the small data 204 store. In some implementations, the memory 210 can be stored on one computing system. In some implementations, the memory 210 can be stored on multiple computing systems. In some implementations, the memory 210 can be stored on one or more remote servers and accessible via network 112.

In some implementations, the insight generator 208 may be configured to generate a preliminary insight in response to a request to optimize an experience. The request, for example, can include a display option (e.g., sort type, advertisement placement, or the like), one or more dimensions, and/or one or more metrics. In some implementations, the display options may refer to any configuration, dimension, feature, etc. of an experience. For example, a typical search result webpage may include options to rearrange, rank, or order the search results, and may include options to sort by: recommended, price (high to low, low to high, etc.), distance from airport, guest rating, star rating, vacation rental, relevance, etc. In addition, the order or ranking of search results can be adjustable based on availability of the particular travel-related service(s). For example, if a first hotel that would otherwise be listed as the first hit for a search is being booked and availability is reduced, then the first hotel can be presented as a second, third, fourth, or omitted from the list of hits. In some examples, each sorting option may be referred to as a display option. The request may instruct the insight generator 208 to access and analyze some portion of data from the small data 204 store. In response to the request, the insight generator 208 can access metric data corresponding to the each of the display options based on the one or more dimensions. In some implementations, the insight generator 208 can determine or calculate a metric value, such as mean metric data, for each display option available based on data received or accessed from the small data 204 store. In addition, the insight generator 208 can determine a metric value, such as mean metric data, for the display option currently implemented by the network environment 100 within the relevant experience. In some implementations, insight generator 208 can be configured to compare display options in order to determine whether or not an insight may result in an improvement to an experience. Specifically, the insight generator 208 can compare metric data between a baseline display option (e.g., a display option currently being used) and other available display options. In some implementations, the insight generator 208 can filter out insights based on the comparison. In one example, a comparison can be made between display options for sorting search results by "recommended" (e.g., which can be the baseline display option, the default display option, and/or the currently implemented display option) versus by "date" (as an alternative display option). In this example, the insight generator 208 can access sampled data (e.g., from the small data 204 store) from memory 210 to determine an insight indicating that sorting by "date" provides a greater CVR value than sorting by "recommended." The insight generator 208 can consider this preliminary insight to be a positive or actionable insight. So, in some implementations, the insight generator 208 can recommend this preliminary insight to be implemented or otherwise automatically implement the preliminary insight itself. However, alternatively, if the insight generator 208 determines sorting by "date" provides a worse or reduced CVR value than sorting by "recommended," then (1) no insight or recommendation may be provided, or (2) information pertaining to the calculation/determination can be presented to a user such as via a graphical user interface for further consideration by the user. In some implementations, the insight generator 208 can discard preliminary insights that result in a metric improvement lower than a threshold. In some implementations, the threshold can correspond to a threshold metric value improvement, a percentage improvement, or the like.

In some implementations, insight extraction core 206 can store the preliminary insights into an insight funnel 216. Insight funnel 216 can be any storage, memory, or data store accessible by the insight extraction core 206 to temporarily store and/or adjust preliminary insights before the insights are stored in the insight index 220. In addition, insight funnel 216 can store insights in the form of tables, vectors, and the like.

Validator 212 can confirm the accuracy or reliability of, or otherwise validate, the insights generated by the insight generator 208. Validating the preliminary insights can improve accuracy of recommended insights that are ultimately recommended by the insight recommendation system 104. For example, preliminary insights can be generated based on a sampled data set, such as the data stored in small data 204. In some cases, the results from the validator 212 can indicate an inconsistency or an inaccuracy of the preliminary insights, such that the preliminary insight is incorrect when tested against the full data set even though it may have been successful/correct when tested against the sampled data set. For example, the insight generator 208 can consider a preliminary insight to be actionable or positive, but when the validator 202 runs the same query against a larger data set but with a different inconsistent result. In some implementations, the validator 212 can validate the preliminary insights generated by the insight generator 208 by running the request 222 against a larger data set. The larger data set can, in some cases, include the data stored in the fact table 202, clickstream data 108, or any other relevant data set that is larger than the small data 204. In addition, the larger data set being used to validate can include data from which the insight generator 208 has already processed or analyzed. In some implementations, the larger data set may be stored in database(s) 214 and accessed by validator 212. In some implementations, the database(s) 214 can be stored on one computing system. In some implementations, the database(s) 214 can be stored on multiple computing systems. In some implementations, the database(s) 214 can be stored on one or more remote servers and accessible via network 112. In some implementations, database(s) 214 can be stored on one or more remote servers and accessible via network 112. In validating the preliminary insights determined by the insight generator 208, validator 212 can confirm insights for a larger representative data set to ultimately recommend (once validated/confirmed by validator 212). In some implementations, validator 212 can update preliminary insights based on the larger data set for a more accurate assessment of how a particular display option can affect the selected one or more metrics (e.g., CVR). In some implementations, validator 212 can generate new insights based on the larger data set. This can include insights that have already been generated by the insight generator 208 and stored in insight funnel 216. The validator 212 can generate insights based on the request and the larger data set stored in database 214. In addition, the validator 212 can feed the generated insights into the duplicate checker 212. In doing so, the validator 212 can validate the preliminary insights by confirming accuracy with the larger data set. In addition, the validator 212 can edit, replace, or discard the preliminary insights that are inconsistent with the generated insights based on the larger data set (since the results based on the larger data set would be more accurate/precise due considering a more complete picture of the data). In some implementations, the validator can discard insights that result in a metric improvement lower than a threshold. In some implementations, the threshold can correspond to a threshold metric value improvement, a percentage improvement, or the like.

Duplicate checker 218 can, in some implementations, remove duplicate insights that are generated by the insight extraction core 206. As noted herein, both the insight generator 208 and the validator 212 can generate, create, or otherwise determine insights based on one or more data sets. In some implementations, the insight generator 208 can determine one or more insights based on a first request and small data 204 stored in memory 210. In some implementations, the validator 212 can determine one or more insights based on the first request and a larger data set stored or accessed in database(s) 214. The data sets accessed by either the insight generator 208 and the validator 212 can contain overlapping metric data (e.g., CVR data from a specific day for returning users of a mobile app). As such, the insight generator 208 and validator 212 can generate identical insights. In some embodiments, the insight generator 208 stores the generated insights in the insight funnel 216. In some embodiment, the validator 212 can first transmit generated insights to the duplicate checker 218 in order to remove overlapping insights before the insights are stored in the insight index 220. For example, the duplicate checker 218 can, for each insight generated by the validator 212, access the insight funnel 216 and check whether that insight is already stored in the insight funnel 216. If the insight already exists in the insight funnel 216, the duplicate checker 218 can remove, discard, or otherwise erase the generated insight from the validator 212. In a case where the insight does not exist in the insight funnel 216, the insight recommendation system 104 can proceed to store the generated insight from the validator 212 in the insight funnel 216.

Recommended insights from insight recommendation system 104 can be accessed by analytics display 110. In some implementations, analytics display 110 can be any user-facing interface or platform through which a user (e.g., of user device(s) 102) can access and interact with the insight recommendation system 104. In some implementations, analytics display 110 can be a portal or other interface through which a user can access components of insight recommendation system 104. For example, a user can, through analytics display 110, input a request to optimize an experience, such as an experience for a booking or travel-related service. In some implementations, a user can, through analytics display 110, request to optimize an experience based on one or more metrics. In some implementations, a request to optimize an experience can include a text-based question to interact with the data (e.g., clickstream data) or otherwise initiate the process of recommending an insight, such as "What improves CTR for Returning Traveler?" In some implementations, results from the insight recommendation system 104 can be displayed within an interface of the analytics display 110. In some examples, the insights can be ranked according to criteria, such as an order, a threshold, or an organization. In addition, the insights can be displayed according to the ranking. For example, at least a portion of insight recommendations can be displayed within the interface of the analytics display 110, such as in a list form (e.g., ranked by order of highest positive impact to a designated metric in a request). In some implementations, the insights are displayed according to a natural language question (e.g., "What improves CTR for Returning Traveler?"). In some implementations, recommended insights can be filtered by the insight recommendation system 104 before being displayed in the interface of the analytics display 110. In addition, recommended insights can be ranked, ordered, or otherwise organized in any variety of ways in the analytics display 110.

In some implementations, insights generated and stored in insight index 220 can be used for a variety of application and/or use cases. For example, the insight recommendation system 104 can select an insight and implement the insight to optimize the experience. In this example, the selected insight corresponds to the highest-ranked insight. In addition, the selected insight can be implemented to optimize the experience as queried in the associated request. For example, a configuration of the experience can be set to a display option corresponding to the selected insight. In some examples, the insight recommendation system 104 can receive a selection of the insight, such as from a user or other third party or component, and automatically implement the insight to optimize an experience. These concepts are explained further herein, such as in FIGS. 3A and 3B.

III. Example Insight Recommendation Use Cases

Figure 3:
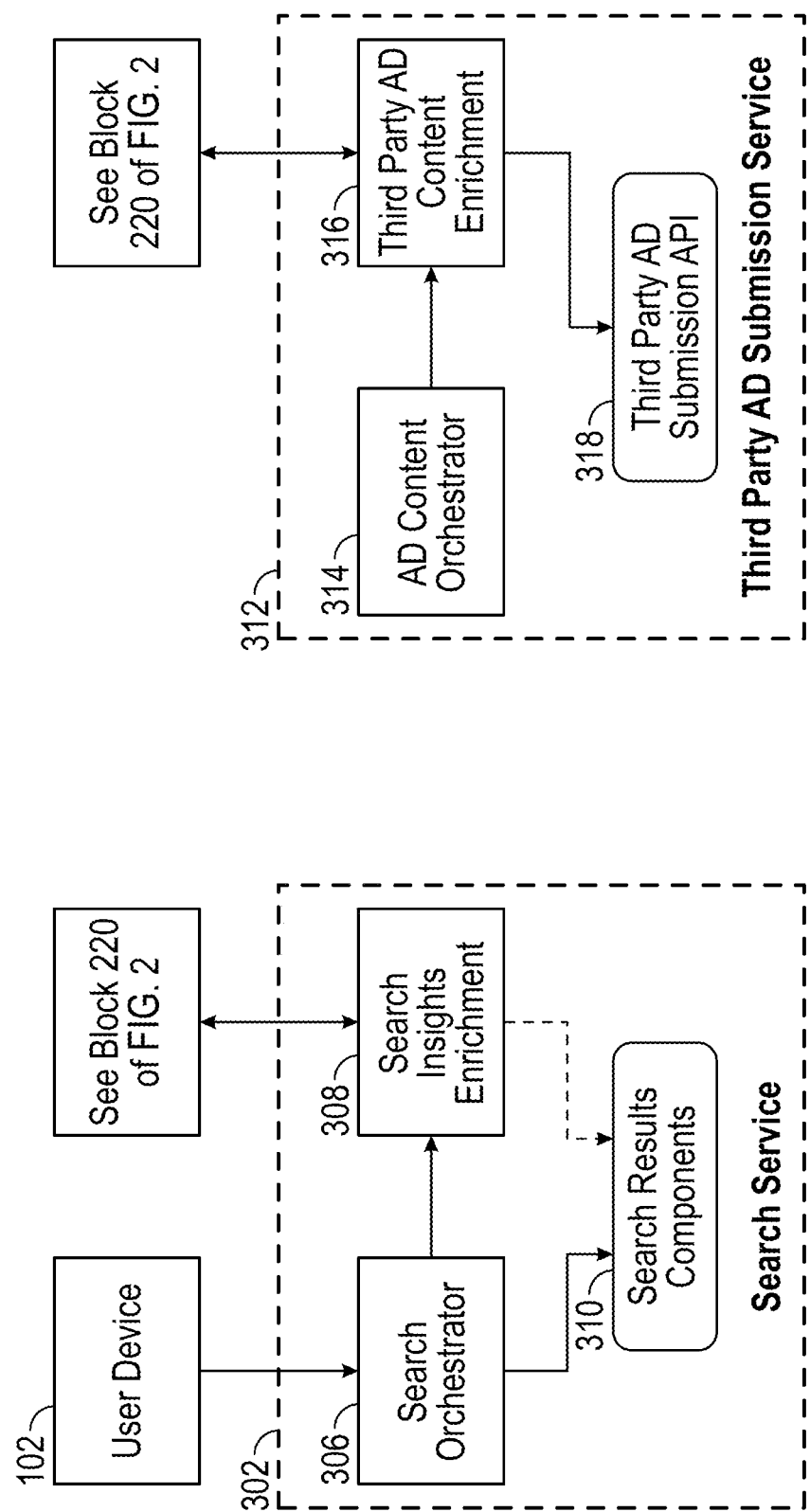
FIGS. 3A-3B are block diagrams of an example data flows in which the insight recommendation system may operate for particular use cases, according to various aspects of the present disclosure.

FIGS. 3A-3B are block diagrams of an example data flow processes in which the insight recommendation system may operate for particular use cases, according to various aspects of the present disclosure.

FIG. 3A is a block diagram of an example data flow process in which the insight recommendation system 104 can operate for one or more search services. For example, the insight recommendation system 104 can be connected to search service 302.

In some implementations, the search service 302 can include any search-related service in connection with an experience. For example, the search service 302 can include an interface or experience in which a user can access any search-related travel booking service, such as searching or looking up flights, hotels, car rentals, activities/excursions, and the like. Search service 302 can include a search orchestrator 306, a search insights enrichment 308, and search results component 310.

In some implementations, the search orchestrator 306 can include an interface in which a user search query or request to the search service 302 is received. For example, the search orchestrator 306 can parse a query input into the search service 302 and, in response to the request, access various components such as databases or other services to retrieve search results. In some implementations, retrieved search results can be displayed in an experience, such as on a website, native app, mobile application, etc.

Search results components 310 can include any feature or element relating to the search results in an experience. In some implementations, the search results components can include any visual element or appearance. For example, the search results components 310 can include a sort type (e.g., recommended, by price, by distance, by star rating, by traveler type, or the like), a configuration, a sizing, a font type, a location, a color, an amount of search results, or any other user interface element relating to the search results provided by the search service 302. In some examples, the search results components 310 can include any orderings or listing in an experience, such as the order of search results pertaining to lodging, travel bookings, flights, car rentals, activities, itineraries, dining, and the like. Orderings or listing can also include the layout of titles, images, text, and any other feature that may appear in the experience. In some implementations, the search results components 310 may include the content shown in the search result itself, such as specific features or amenities, such as a pool, spa, distance from airport/downtown/etc., images, etc. that may be shown. In some cases, the search results components 310 may include content of a search result including the number of results listed, the sizing of the search results, the colors of the results, etc.

In some implementations, the insight recommendation system 104 can be utilized by a search service 302 to implement insights recommended by the insight recommendation system 104. For example, there may be a desire to utilize the capabilities of insight recommendation system 104 to adjust an experience relating to the search service 302 (e.g., to improve one or more metrics). For example, there may be a desire to optimize a mobile app experience for a search service. In addition, a request can specify optimization of the mobile app experience for the search service based on click count. Here, the insight recommendation system 104 may access and compare click count metric data, for various display options, such as the title of search results, the wording or phrasing of the search results, the description of the search results, and/or the images utilized with the search results the wording/phrasing in the title, the description, the pictures used/shown. This may result in insights indicating a greater click count for users of the search service on the mobile app when an image is shown before a title. In another example, an insight may indicate a greater click count for users of the search service on the mobile app when the description of the search results is shorter and more concise, as opposed to a longer string of text. These are two examples of recommended insights that the insight recommendation system 104 can generate and recommend as a use case.

In some implementations, the insight recommendation system 104 can be connected to the search insights enrichment 308. Given a request to optimize a feature of the search service 302, such as a display option, the search insights enrichment 308 can access insights from the insight index 220 of insight recommendation system 104. In some implementations, insights from insight index 220 can be implemented within the search service 302 by the search insights enrichment 308. For example, the search insights enrichment 308 can update a feature of the search service 302, such as the search results components 310. For example, search insights enrichment 308 can implement an insight (e.g., from the insight recommendation system 104) that can be reflected as an update to the search results components 310. In some implementations, this process may be automated. For example, the search insights enrichment 308 can automatically access the insight index 220 for recommended insights and automatically implement the insight into the search results component 310.

FIG. 3B is a block diagram of an example data flow process in which the insight recommendation system 104 can operate for a third-party advertisement submission service (e.g., such as Google AdWords or similar). Typically, travel-booking services and related experiences may be accessible by users from search engines or other third-party websites. For example, a user looking to book a trip can input a query into a search engine, through which the travel-booking service experience can be listed, either as a search result or as a sponsored result. In addition, the third-party search result interface can list a travel-related service, such as any service related to lodging, hotels, flights, car rentals, activities, itineraries, scheduling, tickets, tourism, translation, restaurants, shopping, or the like. as a text-based advertisement, etc. For example, the insight recommendation system 104 can be connected to third-party ad submission service 312. For example, the third-party ad submission service 312 may include a service in which the content of an ad submitted to a third party, such as Google, Meta, Google Ad Words, Yahoo, Bing, other search engine services, or other third-party services, and the like. The third-party ad submission service 312 may include an ad content orchestrator 314, a third-party ad content enrichment 316, and a third-party ad submission API 318.

In some implementations, third-party ad submission service 312 includes ad content orchestrator 314. In some implementations, the ad content orchestrator 314 be configured to determine the content of an ad sent to a third party. In some implementations, a user provides the content or input to the ad content orchestrator 314 to determine the content of the ad to be sent to the third party (e.g., by using an API service or tool provided by the third party, or the like). In some implementations, ad content orchestrator 314 can automatically determine content of an ad to be sent to the third party (e.g., by using an API service or tool provided by the third party, or the like). In some implementations, ad content orchestrator 314 can automatically generate and send content of an ad to the third party (e.g., by using an API service or tool provided by the third party, or the like).

In some implementations, the insight recommendation system 104 can be utilized by the third-party ad submission service 312 to implement recommended insights. For example, there may be a desire to optimize the content of an advertisement relating to a travel-related service to be sent to the third party to improve an experience or metrics relating to that service. For example, a request to the insight recommendation system 104 can include content options relating to the content of an advertisement. In such examples, the content provided to a third-party ad submission service 312 for final display within the third-party service can be updated.

In some implementations, the insight recommendation system 104 can be connected to third-party ad content enrichment 316. Given a request to optimize the ad content of the third-party ad submission service 312, such as a text-string relating to the service to be displayed within the third-party service, third-party ad content enrichment 316 can access insights from the insight index 220 of insight recommendation system 104. In some implementations, insights from insight index 220 can be implemented within the third-party ad submission service 312 by third-party ad content enrichment 316. For example, the third-party ad content enrichment 316 can update content from the ad content orchestrator 314 based on insights from the insight index 220. In addition, the third-party ad content enrichment 316 can send the enriched ad content to the third-party ad submission API 318. In some implementations, the third-party ad submission API 318 can transmit of ad content to third parties. As an example, the third-party ad submission API 318 may submit the enriched ad content from the third-party ad content enrichment 316 to various third parties for further display and or processing.

IV. Example Insight Recommendation by Insight Generator

Figure 4:
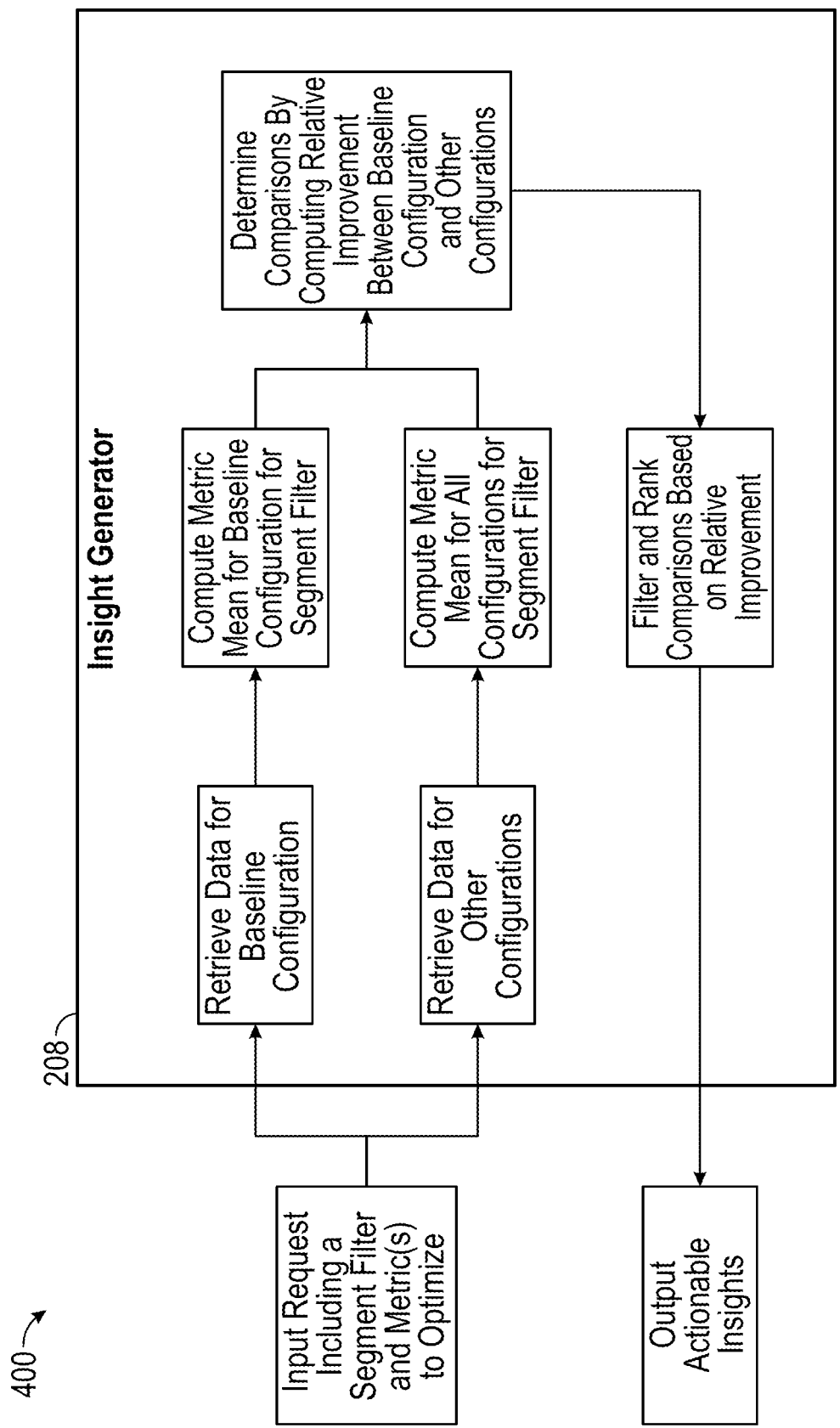
FIG. 4 is a flow diagram of an exemplary process for recommending an insight, according to various aspects of the present disclosure.

FIG. 4 is a flow diagram of an exemplary process for recommending an insight, according to various aspects of the present disclosure. In some implementations, a process for recommending an insight can be performed by the insight generator 208 (e.g., as described with respect to FIG. 2).

At block 402, a request to optimize or improve an experience can be input into the insight generator 208. In some examples, the request includes a dimension and one or more metrics to optimize for a particular experience. In some implementations, the request can include a dimension, a display option, and one or more metrics. The dimension can define certain filters, to which the corresponding metric data will be analyzed to recommend insights. For example, a user can desire to improve a conversion rate (CVR) related to a search result sort type on a native application on a mobile phone. In this case, the dimensions can include "experience_type=native app" and "device_type=mobile." In this example, the metric is the conversion rate. Also, in this example, the display option may be any feature relating to an experience, such as any configuration, dimension, feature, etc. of an experience. In the case above, the display option is the search result sort type. the request may include more than one metric, filters, and display options. For example, to build off of the example above, a similar request may include a query to optimize a CVR related to a search result sort type on a native application on a mobile phone for returning users. This request may filter the request by both querying CVR metric data for users based on the mobile native app and for returning users only. In some implementations, the request to optimize the service may include a text-based question or query. In the example above, the corresponding text-based question may include "What is the best sort type for displaying search results?" In some implementations, the request can include selections, such as from a drop-down menu or other interface menu display, a query from a third party, or the like.

At block 404, the insight generator 208 accesses, receives, or retrieves data for a baseline display option. In some implementations, a baseline display option can refer to a default and/or current display option implemented by or in an experience. For example, a current display option for a sorting feature can automatically sort or order search results by "recommended." In this example, the baseline display option would be by "recommended." In some implementations, the insight generator 208 can access data that has been sampled and stored (e.g., in a small data 204 store). In this example, the small data store can store data from a fact table (e.g., 202) or clickstream data (e.g., 108) that has already been sampled and/or curated for the purpose of insight recommendation. In some implementations, data accessed, received, or retrieved by the insight generator 208 includes metric data corresponding to the request.

At block 406, the insight generator 208 computes a metric value for the baseline configuration corresponding to the request. For example, the metric value for the baseline display option can be based on average metric data for the display option. For example, the metric value for a recommended sort type, in a native app experience, can include a 30% CVR. This percentage may represent the conversion rate for search results listed in the native app when the results are sorted by recommended. In some implementations, the average metric data can correspond to an average metric value for a display option over a period of time. In some implementations, the average metric data can correspond to an average metric value for a display option across a variety of experiences, or just for one experience.

At block 408, the insight generator 208 accesses, receives, or retrieves data for one or more other available display options. The one or more other available display options, or other display options, can include some or all of the other display options (excluding the baseline display option). For example, in the case of sort types, if the baseline display option is sort by "recommended," the other display options can include sort by "distance," "guest rating," "relevance," "price," "price high to low," "price low to high," "price relevance," "star rating," etc. In some implementations, the insight generator 208 can concurrently access, receive, or retrieve both baseline display option data and the other display option data. In some implementations, the insight generator 208 can access, receive, or retrieve the baseline display option data and the other display option data at different times. For example, the current display option for a sorting feature can automatically sort or order search results by "recommended." In this example, the baseline display option would be by "recommended." In some implementations, the insight generator 208 can access data corresponding to the other display options that has been sampled and stored in a small data store (e.g., 204). In this example, the small data store can store data from a fact table (e.g., 202) or clickstream data (e.g., 108) that has already been sampled and/or curated for the purpose of insight recommendation. In some implementations, data accessed, received, or retrieved by the insight generator 208 includes metric data corresponding to the request. In some implementations, the data accessed for the display options includes a causal relationship between one or more dimensions. For example, the data corresponding to the display options may be related to the data corresponding to another display option in that both display options related to the sort type, configuration, parameter, etc.

At block 410, the insight generator 208 computes a metric value for the other display options corresponding to the request. For example, the insight generator 208 computes a metric value, such as a mean metric value, for each of the other display options. In some implementations, the metric value for the other display options may be based on the average metric data. In some implementations, the metric value may correspond to an average metric value for a display option over a period of time. In some implementations, the metric value may correspond to an average metric value for a display option across a variety of experiences. For example, a metric value for a display option such as a star rating sort order, might be 25% CVR. This percentage represents the conversion rate for search results listed in the native app when the results are sorted by star rating. In addition, the metric value for a display option corresponding to a price sort order (low to high) can be 10% CVR. This percentage represents the conversion rate for search results listed in the native app when the results are sorted by price (low to high).

At block 412, the insight generator 208 compares between the display options by computing a relative improvement between the baseline display option and one or more of the other display options. For example, the insight generator 208 compares the relative improvements in metric data for the baseline display option as compared to each of the other display options. For example, in some implementations, an insight can include a percentage increase or decrease in metric value corresponding to a designated metric and/or any applicable/designated dimensions. For example, a request to recommend insights can include a selected metric, such as click count, dimensions, such as Native App experience and returning traveler. In this example, a sample insight recommended over a portion of sampled data can include "For click_count, increase of 23.5% is observed over 50% of the data when experience_type=Native App and sort_type=recommended and traveller_type=returning." As shown in this string of text, the improvement in click count as compared between a sort type of recommended vs. the baseline display option (e.g., may be any other display option besides "recommended") results in an improvement of 23.5% according to a sampled data set of 50% of the total data.

At block 414, the insight generator 208 filters the comparisons from block 412 based on relative improvement. For example, the insight generator 208 can discard or otherwise omit any comparisons in which metric data value for a first display option of the other display options is lower than the metric data value for the baseline display option indicating that the first display option would not be an improvement and would in fact be worse than the baseline display option (e.g., at least with respect to the metric included with the request). Also, at block 414, the insight generator 208 can rank the comparisons based on the relative improvement. For example, the insight generator 208 ranks the comparisons from "most improved metric data" to "least improved metric data."

At block 416, the insight generator 208 outputs actionable insights. In some implementations, the actionable insights that are output can be based on the comparisons determined by the insight generator 208. For example, the actionable insights can include the relative improvement in metric values between compared display options for a user or person to review (e.g., via analytics display 110). In some embodiments, the insight generator 208 outputs the insights to another process or component for further processing and/or implementation into an experience. For example, in some implementations, the implementation into an experience can include an automatic update to the display option of an experience so that a user accessing a particular service via an experience can see the updated display option without any additional programming by a developer or website administrator. In some examples, the implementation into an experience can include prompting a third party, user, or other component of the network environment to implement an update or change to an experience manually. With such a prompting and instructing of a developer, it would be easier for the developer to implement such a change without necessarily understanding how to calculate or determine the basis of the decision underlying the change (e.g., that the change would result in an improved metric). In some examples, the implementation into an experience can include generating a report and transmitting display instructions configured to display one or more recommended insights, such as to a third party, a user, or other component of network environment (e.g., via a user device 102, or analytics display 110, or the like) such as for research purposes.

The following example demonstrates a non-limiting example of an improvement to a sort type. For example, in one scenario relating to a hotel search result experience, the baseline display option for sort type of results may be "recommended" (e.g., search results are, by default, listed by a recommended order). In addition, other display options (e.g., other sort types) may include "price low to high," "price high to low," "distance from airport," and "star rating." In this example, a request to recommend insights includes an inquiry to improve a CTR based on a sort type for a webpage experience. At block 404, the insight generator 208 may retrieve CTR metric data corresponding to the "recommended" sort type display option from a database. At block 408, the insight generator 208 may compute the metric value for the recommended sort type display option. In some implementations, the metric value may correspond to an average CTR value corresponding to the sort type display option over a period of time, across various experiences, from a portion of users, etc. Similarly, at block 408, the insight generator 208 may retrieve CTR metric data corresponding to the rest of the other display types. In this example the insight generator 208 may retrieve CTR metric data corresponding to each of the remaining sort types including price low to high, price high to low, distance from airport, and star rating. At block 410, the insight generator 208 may compute the metric value for each display option based on the retrieved CTR metric data. In some implementations, the mean metric may correspond to an average CTR value corresponding to the sort type display option over a period of time, across various experiences, from a portion of users, etc. In this example, at block 412, the insight generator 208 may determine a comparison between the average CTR values for all the display options. For example, the insight generator 208 may compare the mean metric CTR value for the "recommended" sort type with the metric CTR value for the star rating sort type. In addition, the insight generator 208 may compare the metric CTR values between all of the display options. In some implementations, the insight generator 208 may determine a comparison between the baseline display option and each one of the other display options based on the metric value. For example, in some implementations, the comparison may include a difference between the metric values of display options. In some implementations, the comparisons may indicate an improvement in metric value. For example, an improvement may occur when one sort type results in a high clickthrough value when compared to a second sort type.

V. Example Insight Data Table

FIG. 5 is an example table 500 depicting extracted metric data generated within the insight recommendation system (e.g., 104), according to various aspects of the present disclosure. The content and configuration of table 500 is illustrative. In some implementations, table 500 represents sampled metric data accessed (e.g., from databases such as fact table 202, clickstream data 108) based on a request. In some implementations, the configuration of table 500, such as the number and types of columns and rows vary depending on the request.

Table 500 includes information stored in rows and columns. In some implementations, each row (apart from the first row which may indicate the headers of the table 500) can represent metric data corresponding to a comparison between a baseline display option and one or more other available display options for a particular experience. In some implementations, each column may display various dimensions, metric data values, comparisons, and other information relevant to recommending insights.

Column 506 corresponds to a metric. A metric can include any quantitative measurement relating to an experience. For example, in the context of a search service, metrics can include a price detail product count, a rate plan view count, a review view count, a count relating to opening a property image gallery, or the like. Metrics can also include an order count, a booking count, a purchase button count, a purchase button product count, or the like. In some implementations, metrics relate to a user's propensity for certain actions within the experience, such as a top ten click percentage, a top ten booking percentage, an indicator whether a user has or has not clicked, an indicator whether a user has or has not booked, a top ten click count, a top ten booking, an indicator whether a destination has been changed, an indicator whether a trip duration has changed, an indicator whether a date has changed, an indicator whether a party size has changed, an indicator whether a room count has changed, or the like. In some implementations, metrics relate to a user's engagement level, such as a click count (CTR), a scroll count, a view count, a gallery open count, etc. Metrics may also include values and/or data related to affiliate marketing (AFF), brand awareness (BRA), direct marketing, traffic, or booking (DIRECT), email marketing (EML), inbound marketing (ICM), marketing data platform (MDP). As shown in column 506, the table 500 may include more than one metric, such as click count, order count, click median, or the like. In some implementations, a request may include more than one metric, and as such, table 500 may include more than one metric in column 506.

Columns 516-524 correspond to one or more dimensions, as indicated in a request. In some implementations, a request can specify more than one dimension (e.g., experience type, traveler type, date range, or the like) in which insights are requested to be generated. As such, columns 516-524 may denote the specific dimensions in which metric data for a certain display option comparison was retrieved. In some examples, the one or more dimensions may correspond to various dimensions and/or any feature relating to an experience, such as experience type, dimension count, country code, brand name, member tier, and the like. Because a request can include more than one dimension, various combinations of dimensions corresponding metric data values may be included in the table 500.

Column 502 corresponds to a baseline display option and may be denoted as "baseline_value." Depending on the request, the baseline value may vary depending on the display option. For example, table 500 illustrates information accessed by the insight recommendation system 104 corresponding to a sort type display option request. In this example, the baseline display option is "recommended" (e.g., the default sort type is currently recommended). In some examples, column 502 may display a variety of baseline display options, depending on the request.

Column 504 corresponds to an improved value, or improved display option, and may be denoted as "improved_value." In some implementations, column 504 denotes a display option that results in an improved metric value over the metric data of the baseline display option. As shown in column 504, the improved value corresponds to any display option apart from the baseline display option. For example, in the case of sort type display options wherein the baseline display option is "recommended," the improved values may include "price," "distance," or other sort type.

Column 508 corresponds to a metric value for the baseline display option and may be denoted as "metric_baseline." For example, the metric values listed in column 508 correspond to a metric value, an average metric value, a mean metric value, and/or another representation of the metric data accessed by insight recommendation system 104 in recommending insights. As shown by each row of the table 500, the metric_baseline for the baseline display option may differ depending on the dimensions in columns 518-524.

Column 510 corresponds to the metric data of the improved value of column 504 and can be denoted as "metric_improved." For example, the metric values listed in column 510 may correspond to a metric value, an average metric value, a mean metric value, and/or another representation of the metric data accessed by insight recommendation system 104 in recommending insights. As shown by each row of the table 500, the metric_improved for the baseline display option may differ depending on the dimensions in columns 518-524.

Column 512 corresponds to a comparison between the columns 508 and 510, metric_baseline and metric_improved columns, respectively. The comparison denoted in column 512 as "improvement." As shown in column 512, a calculation or comparison may be made between the two columns 508 and 510 to compare the respective metric data values. In some implementations, the improvement can be in the form of a difference between the metric_baseline and metric_improved values. In some implementations, the improvement may be in the form of a percentage improvement. For example, in the first row, in column 512, the improvement may be displayed as a percentage improvement of the click count when the sort type display option is "price" instead of "recommended."

In some implementations, the table 500 includes additional information columns, such as column 514. In some examples, these additional information columns include information pertaining to the metric data, the display options, or any other part of the request. For example, column 514 corresponds to a count, such as a click count, which is information corresponding to the click count metric. In some implementations, additional information columns may store other types of information relevant to the comparison and/or analysis of metric data.

VI. Example Flow Diagram

Figure 6:
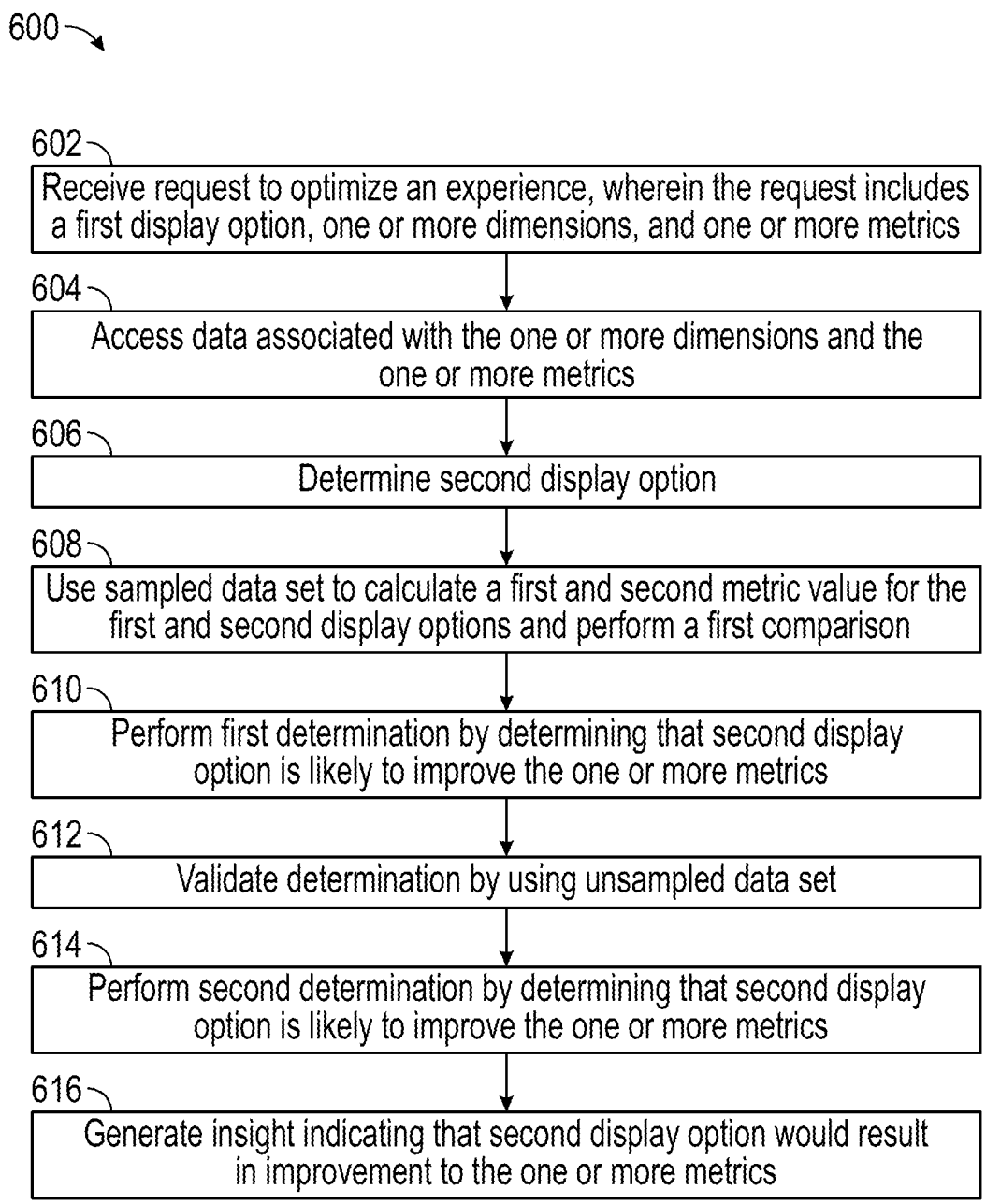
FIG. 6 is a flow diagram showing an example routine of an insight recommendation, according to various aspects of the present disclosure.

FIG. 6 is a flow diagram showing an example routine 600 of insight recommendation (e.g., as performed by an insight recommendation system such as 104), according to various aspects of the present disclosure.

At block 602, a request to optimize an experience is received. In some implementations, the request includes one or more dimensions. In addition, in some implementations, the request includes at least a first display option of a plurality of display options. In some implementations, the display option may refer to any configuration, dimension, feature, or the like associated with an experience. For example, a configuration can include a layout, design, or appearance of an experience. In addition, the dimension may define certain dimensions, to which the corresponding metric data will be analyzed to recommend insights. In addition, the request may include one or more metrics.

At block 604, data may accessed (e.g., by an insight recommendation system such as 104). In some implementations, metric data is associated with the one or more metrics and the one or more dimensions. Metrics can include any quantitative measurement relating to an experience. For example, in the context of a search service, metrics can include a price detail product count, a view count, a count relating to opening an image gallery (e.g., for a lodging), or the like. Metrics can also include an order count, a booking count, etc. An order count can refer to a number of times that product or service was selected or purchased, a booking count may refer to a number of times that a service (e.g., a flight, accommodation, or the like) was booked. In some implementations, metrics are related to a user's propensity for certain actions within the experience, such as a top ten click percentage, a top ten booking percentage, an indicator whether a user has or has not clicked, an indicator whether a user has or has not booked, a top ten click count, a top ten booking, an indicator whether a destination has been changed, an indicator whether a trip duration has changed, an indicator whether a date has changed, an indicator whether a party size has changed, an indicator whether a room count has changed, etc. Metrics can also be related a user's engagement level, such as a click count (CTR), a scroll count, a view count, a gallery open count, a like count, a favorite count, a view duration, a percentage of clicks in top ten positions, a percentage of orders from top ten position, a quality of reviews for top ten positions, an inspection of detailed images for top ten positions, a number of bounces, a page duration, a duration of review for top ten positions, etc. Metrics may also include values and/or data related to affiliate marketing (AFF), brand awareness (BRA), direct marketing, traffic, or booking (DIRECT), email marketing (EML), inbound marketing (ICM), marketing data platform (MDP). In some implementations, metric data associated with certain dimensions may be accessed.

At block 606, a second display option can be determined. In some implementations, the second display option can include multiple display options (e.g., the second display option, third display option, fourth display option, etc.). In some implementations, the second display option can be of a plurality of display options. In some implementations, the second display option can refer to any configuration, dimension, feature, or the like associated with an experience. For example, a configuration can include a layout, design, or appearance of an experience. In some implementations, the second display option can be distinct or different from the first display option.

At block 608, a sampled data set can be used to perform additional processes. For example, the sampled data set can be used to calculate a first metric value for the first display option. the metric value for a first, or baseline display option, for example, can be based on the average metric data. In some implementations, the average metric data corresponds to an average metric value for a display option over a period of time, for certain users, for certain experiences, or the like. In some implementations, the metric value can correspond to an average metric value for a display option across a variety of experiences. For example, in some implementations, the display option can be one of a plurality of display options. In some implementations, display options corresponds to display option a sort type, an advertisement placement, an advertisement style (e.g., language or phrasing, images used, etc.), or any feature or element related to an experience. In addition, at block 608, the sampled data set may be used to calculate a second metric value for the second display option, according to the methods above.

In addition, at block 608, the sampled data set can be used to perform a first comparison by comparing the first metric value with the second metric value. For example, in some implementations, the first comparison may be determined by comparing metric value for a first display option, such as the baseline display option, with other available display options, such as the second display option. In some implementations, the metric value corresponding to a first, or baseline, display option can be compared with each of the other available display options. In some implementations, the comparison between display options includes a percentage increase or decrease in metric value. For example, a comparison may include "an increase of 25.3%" of click count for when the display type is "sort_type=recommended" over a baseline display option of "sort_type=price." In some implementations, additional comparisons can be performed for any other identified display options.

At block 610, based on the first comparison, a first determination can be performed. In some implementations, the first determination can be performed by determining that the second display option is likely to improve the one or more metrics for the one or more dimensions. For example, if a percentage difference in an identified metric is positive (e.g., either above 0, by a designated or automatically selected threshold, or similar), then a determination can be made that the second display option is likely to improve the one or more metrics for the one or more dimensions. Alternatively, if a percentage difference in an identified metric is negative or 0, then a determination can be made that the second display option is not likely to improve the one or more metrics for the one or more dimensions. Additionally, for example, if the first display option is compared to itself, the result should be no relative difference between the display options (e.g., 0% difference). In some implementations, and due to the fact that testing on larger data sets can be resource intensive, selection of a limited number of display options (e.g., to be validated at block 612) may be a factor. So, a threshold or limit on the number of identified display options to validate can be implemented manually or automatically. For instance, in some implementations, a preconfigured threshold can be set manually so that an identified display option is only validated if it exceeds the threshold (e.g., 1% improvement, 5%, 10%, 150%, etc.). In some implementations, the threshold can be automatically applied. For example, only the display options that show the most improvement over the first, or baseline, display option can be identified for validation, such as the top 1, 2, 3, 5, etc. display options. For such an implementation, the percentage improvement may not be a factor and instead only the limit can be implemented. In some implementations, both a preconfigured threshold and a limit on the number of identified display options to validate can be used.

At block 612, the first determination can be validated. In some implementations, the first determination can be validated using an unsampled data set. In addition, at block 612, the unsampled data set can be used to calculate a first metric value for the first display option. For example, the metric value for a first, or baseline, display option can be based on an average of associated metric data. In some implementations, the average metric data corresponds to an average metric value for a display option over a period of time (e.g., for certain users, for certain experiences, or the like). In some implementations, the metric value can correspond to an average metric value for a display option across a variety of experiences. For example, in some implementations, the display option can be one of a plurality of display options. In some implementations, display options an include one or more of: a sort type, an advertisement placement, an advertisement style (e.g., language or phrasing, images used, etc.), or any feature or element related to an experience. In addition, at block 608, the unsampled data set can be used to calculate a second metric value for the second display option, according to the methods above.

At block 612, the unsampled data set can be used to perform a second comparison by comparing the first metric value with the second metric value. For example, in some implementations, the first comparison may be determined by comparing metric value for a first display option, such as the baseline display option, with other available display options, such as the second display option. In some implementations, the metric value corresponding to a first or baseline display option can be compared with each of the other available display options. In some implementations, the comparison between display options includes a percentage increase or decrease in metric value. For example, a comparison may include "an increase of 25.3%" of click count for when the display type is "sort_type=recommended" over a baseline display option of "sort_type=price." In some implementations, additional comparisons can be performed for any other identified display options determined to likely be an improvement over the first display option.

At block 614, based on the second comparison, a second determination can be performed. In some implementations, the second determination can be performed by determining that the second display option is likely to improve the one or more metrics for the one or more dimensions. For example, if a percentage difference in an identified metric is positive (e.g., either above 0, by a designated or automatically selected threshold, or similar), then a determination can be made that the second display option is likely to improve the one or more metrics for the one or more dimensions. Alternatively, if a percentage difference in an identified metric is negative or 0, then a determination can be made that the second display option is not likely to improve the one or more metrics for the one or more dimensions. Additionally, for example, if the first display option is compared to itself, the result should be no relative difference between the display options (e.g., 0% difference). In some implementations, and due to the fact that testing on larger data sets can be resource intensive, selection of a limited number of display options (e.g., to be validated at block 612) may be a factor. So, a threshold or limit on the number of identified display options to validate can be implemented manually or automatically. For instance, in some implementations, a preconfigured threshold can be set manually so that an identified display option is only validated if it exceeds the threshold (e.g., 1% improvement, 5%, 10%, 150%, etc.). In some implementations, the threshold can be automatically applied. For example, only the display options that show the most improvement over the first, or baseline, display option can be identified for validation, such as the top 1, 2, 3, 5, etc. display options. For such an implementation, the percentage improvement may not be a factor and instead only the limit can be implemented. In some implementations, both a preconfigured threshold and a limit on the number of identified display options to validate can be used.

At block 616, an insight can be generated. In some implementations, the insight may indicate that the second display option would likely result in an improvement to the one or more metrics for the one or more dimensions. As noted herein, an insight refers to any discovery of a pattern in data or relationships between variable that may not have been previously known. In some implementations, an insight is determined for each comparison between a baseline display option and other available display options. For example, each insight can include a comparison between a specific metric value relating to a first display option and the metric value corresponding to a second display option. For example, an insight can be generated between a "recommended" sort type display option and a by "time" sort type display option so that there is some difference in the two options that can be reflected as a percent change/difference between the two. For example, in some implementations, an insight can include a percentage increase or decrease in metric value corresponding to a designated metric and/or any applicable/designated dimensions. For example, a request to recommend insights can include a selected metric, such as click count, dimensions, such as Native App experience and returning traveler. In this example, a sample insight recommended over a portion of sampled data can include "For click_count, increase of 23.5% is observed over 50% of the data when experience_type=Native App and sort_type=recommended and traveller_type=returning." As shown in this string of text, the improvement in click count as compared between a sort type of recommended vs. the baseline display option (e.g., may be any other display option besides "recommended") results in an improvement of 23.5% according to a sampled data set of 50% of the total data. In some implementations, an insight can be generated for each comparison between display options and the baseline display option. In some implementations, an insight can be generated for a comparison between each of the display options. In an example for a website search result experience and a request for optimization of the flight booking search result sort type based on click count, the baseline display option corresponds to recommended (default display option). In the example, the remaining display options include other sort types such as price, distance to airport, guest rating, and star rating. In this example, at block 610, the insight recommendation system 104 may determine an insight for each comparison of the display option. For example, the insight recommendation system 104 may generate an insight for a comparison of click count metric data as between the recommended sort type (baseline display option) and the by price, by distance to airport, by guest rating, and by star rating, respectively. In addition, the insight recommendation system 104 may generate an insight for a comparison between the display options. For example, an insight may be generated between price and distance, distance to airport and guest rating, guest rating and star rating, price and distance to airport, price and guest rating, price and star rating, distance to airport and star rating.

At block 612, the insights are ranked (e.g., based on preconfigured criteria). In some implementations, preconfigured or custom criteria can relate to an order, a threshold, or any other desired organization of insights. For example, the insights can be ranked based on the percentage of improvement to the metric data. For instance, an insight corresponding to a 45% increase in conversion rate (CVR) based on a sort type display option of "recommended" may be ranked higher than an insight corresponding to a 33% increase in conversion based on the sort type display option of "star rating." In some implementations, insights can be removed or discarded if the percentage of metric data improvement is at or below a threshold (e.g., preconfigured to be a set percentage, or dynamic based on a total number of results to present so that no more than a maximum are presented such as the top 3 or top 4, or the like). In some implementations, insights relating to a decrease in metric value based on the display option can be filtered out, omitted, or otherwise discarded. In some implementations, a user accessing the insight recommendation system 104 can specify the preconfigured criteria. In some implementations, the ranking of the insights may be performed automatically by the insight recommendation system.

At block 614, display instructions can be generated to display the ranked insights. For example, analytics display (e.g., 110) can be configured to display the ranked insights. For example, in some implementations, the ranked insights can be displayed as a list. In some implementations, the UI analytics can comprise a panel or interface in which insights may be displayed and accessed by users, third parties, and other components of the network environment (e.g., 100).

At block 616, an insight can be selected. In some implementations, the insight recommendation system 104 can receive an indication of a selection of the insight of the ranked insights. For example, in an implementation where the ranked insights are displayed in the analytics display, a user can provide a selection of an insight. In some implementations, the insight can be selected by a third party, a user, or other components of network environment. In some implementations, the insight recommendation system (e.g., 104) can be configured to automatically select an insight of the ranked insights. For example, the insight recommendation system 104 can be configured to select the top ranked, or highest ranked, insight. In some implementations, the insight recommendation system can be configured to select two or more ranked insights. In some implementations, the insight recommendation system can select an insight based on additional criteria, such as a specific percentage in metric data improvement, or the like.

At block 618, an insight can be implemented. For example, in some cases, the insight recommendation system 104 can facilitate implementation of the insight selected at block 616. In some examples, implementation of the insight can include an automatic update to the display option of an experience. In some examples, implementation can include prompting a third party, user, or other component of the network environment to implement an update or change to an experience. In some examples, implementation can include generating a report and transmitting display instructions configured to display one or more recommended insights, such as to a third party, a user, or other component of network environment (e.g., via a user device 102, or analytics display 110, or the like).

VII. Example Computing System

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other nontransitory computer-readable storage medium or device (e.g., solid state storage devices, disk drives, etc.) The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Figure 7:
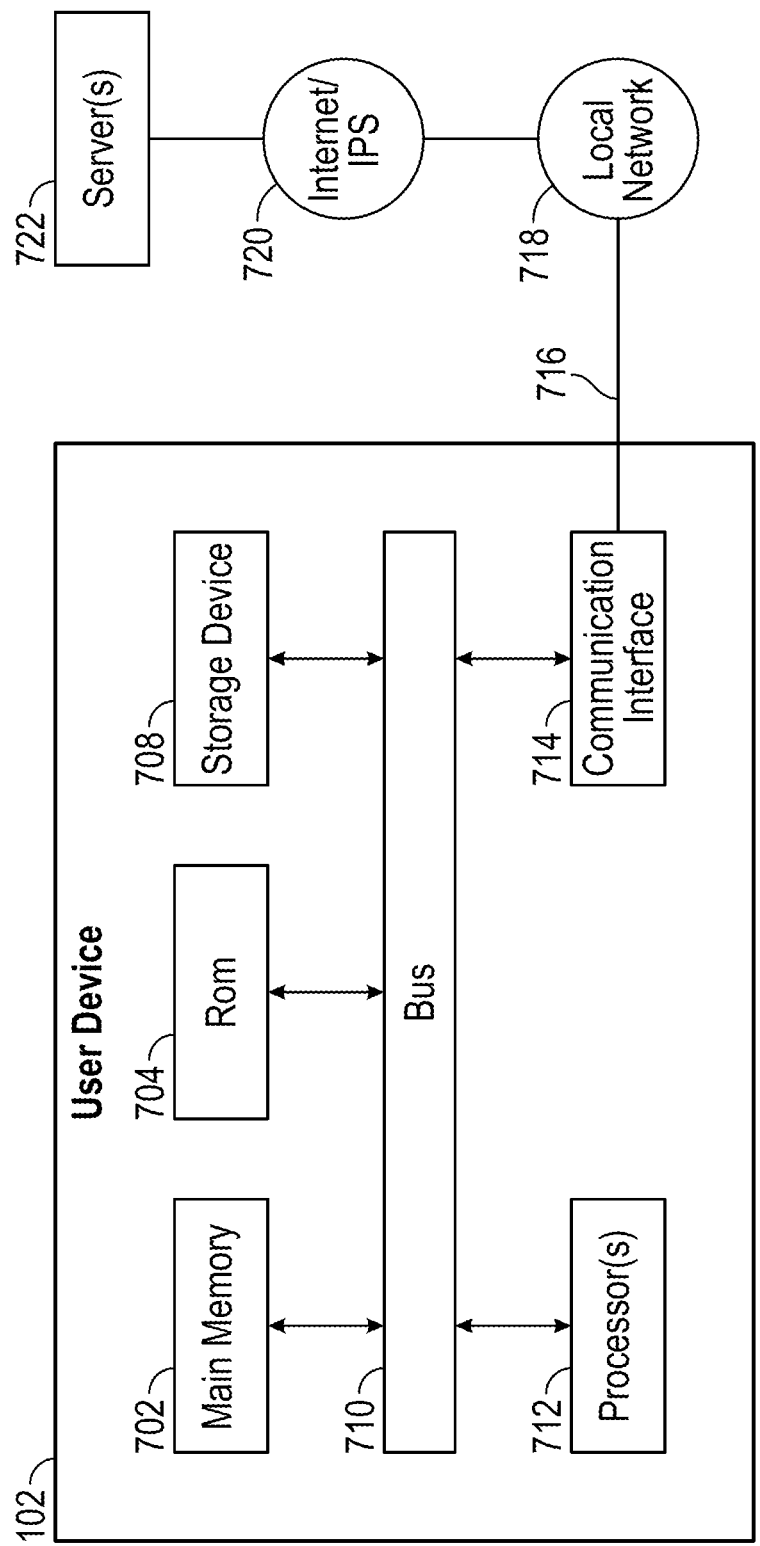
FIG. 7 is a block diagram illustrating components of an example computing system that can be used to implement the various systems and methods described herein.

For example, FIG. 7 is a block diagram that illustrates the user device 102 upon which various embodiments may be implemented. The user device 102 includes a bus 710 or other communication mechanism for communicating information, and a hardware processor, or multiple processors, 712 coupled with bus 710 for processing information. Hardware processor(s) 712 may be, for example, one or more general purpose microprocessors.

The user device 102 also includes a main memory 702, such as a random-access memory (RAM), cache and/or other dynamic storage devices, coupled to bus 710 for storing information and instructions to be executed by processor 712. Main memory 702 also may be used for storing temporary variables or other intermediary information during execution of instructions to be executed by processor 712. Such instructions, when stored in storage media accessible to processor 712, render user device 102 into a special-purpose machine that is customized to perform the operations specified in the instructions.

The user device 102 further includes a read only memory (ROM) 704 or other static storage device coupled to bus 710 for storing static information and instructions for processor 712. A storage device 708, such as a magnetic disk, optical disk, or USB thumb drive (Flash drive), etc., is provided and coupled to bus 710 for storing information and instructions.

Various forms of computer readable storage media may be involved in carrying one or more sequences of one or more computer readable program instructions to processor 712 for execution. For example, the instructions may initially be carried on a magnetic disk or solid-state drive of a remote computer. The remote computer can load the instructions into its dynamic memory and send the instructions over a telephone line using a modem. A modem local to user device can receive the data on the telephone line and use an infrared transmitter to convert the data to an infra-red signal. An infra-red detector can receive the data carried in the infra-red signal and appropriate circuitry can place the data on bus 710. Bus 710 carries the data to main memory 702, from which processor 712 retrieves and executes the instructions. The instructions received by main memory 706 may optionally be stored on storage device 708 either before or after execution by processor 712.

User device 102 also includes a communication interface 714 coupled to bus 710. Communication interface 714 provides a two-way data communication coupling to a network link 716 that is connected to a local network 718. For example, communication interface 714 may be an integrated services digital network (ISDN) card, cable modem, satellite modem, or a modem to provide a data communication connection to a corresponding type of telephone line. As another example, communication interface 714 may be a local area network (LAN) card to provide a data communication connection to a compatible LAN (or WAN component to communicated with a WAN). Wireless links may also be implemented. In any such implementation, communication interface 714 sends and receives electrical, electromagnetic or optical signals that carry digital data streams representing various types of information.

Network link 716 typically provides data communication through one or more networks to other data devices. For example, network link 716 may provide a connection through local network 718 to data equipment operated by an Internet Service Provider (ISP) 720. ISP 720 in turn provides data communication services through the world wide packet data communication network now commonly referred to as the "Internet" 720. Local network 708 and Internet 720 both use electrical, electromagnetic or optical signals that carry digital data streams. The signals through the various networks and the signals on network link 716 and through communication interface 714, which carry the digital data to and from user device 102, are example forms of transmission media.

User device 102 can send messages and receive data, including program code, through the network(s), network link 716 and communication interface 714. In the Internet example, a server 722 might transmit a requested code for an application program through Internet/ISP 720, local network 718 and communication interface 714.

VIII. Additional Implementation Details, Terminology, and Clauses

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of electronic devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable electronic device, a device controller, or a computational engine within an appliance, to name a few.

Many variations and modifications may be made to the above-described embodiments or implementations, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached FIGs. should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Examples of the implementations of the present disclosure can be described in view of the following example clauses. The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1: A method, comprising: receiving a request to optimize an experience, wherein the request identifies: a first display option of a plurality of display options, one or more dimensions, and one or more metrics, accessing data associated with the one or more metrics and the one or more dimensions; determining a second display option of the plurality of display options; using a sampled data set to: calculate a first metric value for the first display option; calculate a second metric value for the second display option; perform a first comparison by comparing the first metric value with the second metric value; and based on the first comparison, perform a first determination by determining that the second display option is likely to improve the one or more metrics for the one or more dimensions; based on the first determination, validate the first determination by using an unsampled data set to: calculate a first metric value for the first display option; calculate a second metric value for the second display option; perform a second comparison by comparing the first metric value with the second metric value; and based on the second comparison, perform a second determination by determining that the second display option is likely to improve the one or more metrics for the one or more dimensions; generating an insight indicating that the second display option would likely result in an improvement to the one or more metrics for the one or more dimensions.

Clause 2: The method of clause 1, further comprising determining a third display option of the plurality of display options; using the sampled data set to: calculate a third metric value for the third display option; perform a third comparison by comparing the first metric value with the third metric value; and based on the third comparison, perform a third determination by determining that the third display option is unlikely to improve the one or more metrics for the one or more dimensions.

Clause 3: The method of clause 1, wherein the plurality of display options includes a user interface selection of the experience, a parameter of the experience, or a configuration of the experience.

Clause 4: The method of clause 1, wherein the first display option includes a set of display options.

Clause 5: The method of clause 1, wherein the data is accessed from a sampled data set.

Clause 6: The method of clause 5, wherein the sampled data set is stored in random access memory.

Clause 7: The method of clause 1, wherein the data includes clickstream data.

Clause 8: The method of clause 1, wherein the one or more dimensions includes a device type, an experience type, a marketing code, a marketing channel, a member tier category, a destination name, a destination shorthand, a destination type, a destination attribution, a destination region, a country code, a country name, a brand group, a brand name, a line of business, a sort type, a traveler type, a travel group type, a room type, a search end, a trip duration, an adult count, a child count, an infant count, a party size, a room count, a filter count, a typeahead character count, a typeahead origin, a typeahead character.

Clause 9: The method of clause 1, wherein the one or more metrics includes a click count, an order count, a booking count, a conversion rate, or a view count, a percentage of clicks in top ten positions, a percentage of orders from top ten position, a quality of reviews for top ten positions, an inspection of detailed images for top ten positions, a number of bounces, a page duration, a duration of review for top ten positions.

Clause 10: The method of clause 1, wherein the metric value includes a mean metric value calculated for each display option of the plurality of display options.

Clause 11: The method of clause 1, further comprising discarding insights that result in an improvement in a metric value lower than a threshold.

Clause 12: The method of clause 1, further comprising ranking insights according to a criteria.

Clause 13: The method of clause 12, wherein the criteria includes an order, a threshold, or organization.

Clause 14: The method of clause 12, further comprising displaying the ranked insights, wherein the ranked insights are displayed in an order based on the ranking, percentage improvement, or relative improvement.

Clause 15: The method of clause 14, wherein the ranked insights are displayed according to a natural language question.

Clause 16: The method of clause 1, further comprising: selecting an insight; and implementing the insight to optimize the experience.

Clause 17: The method of clause 1, further comprising: receiving a selection of the insight; and automatically implementing the insight to optimize the experience.

Clause 18: The method of clause 1, further comprising setting a configuration of the experience to the display option corresponding to the selected insight.

Clause 19: The method of clause 1, further comprising storing the insights in an index.

Clause 20: A system, comprising: a computer-readable storage medium storing program instructions; and one or more processors configured to execute the program instructions to cause the system to: receive a request to optimize an experience, wherein the request identifies: a first display option of a plurality of display options, one or more dimensions, and one or more metrics, access data associated with the one or more metrics and the one or more dimensions; calculate a metric value for each display option of the plurality of display options; determine a set of comparisons by comparing the metric value associated with the first display option with the metric value associated with each of the plurality of display options; determine, for each comparison, an insight by comparing the metric values calculated for each of the plurality of display options to the metric value calculated for the first display option.

What is claimed is:

1. A method comprising:
as implemented by a computing system comprising one or more computer processors configured to execute specific instructions:
receiving, from a first user device, a request to optimize a graphical user interface (GUI) comprising a plurality of selectable interface elements, wherein the request identifies:
a first display option of a plurality of display options,
a dimension, and
a metric,
accessing a stored data set associated with the metric and the dimension;
determining a second display option of the plurality of display options;
calculating, by an insight generator, a first metric value for the first display option, wherein the first metric value is calculated with sampled data from the stored data set;
calculating, by the insight generator, a second metric value for the second display option, wherein the second metric value is calculated with the sampled data from the stored data set;
generating a first comparison between the first metric value and the second metric value;
based on the first comparison, generating a first determination that the second display option is likely to improve the metric for the dimension over the first display option;
generating, by the insight generator, a first insight into the requested metric based on the first determination;
validating the first insight with unsampled data, wherein validating the first insight with the unsampled data comprises:
calculating, by an insight validator, an updated first metric value for the first display option, wherein the updated first metric value is calculated with the unsampled data; and
calculating, by the insight validator, an updated second metric value for the second display option, wherein the updated second metric value is calculated with the unsampled data;
generating a second comparison between the updated first metric value and the updated second metric value;
based on the second comparison, generating a second determination that the second display option remains likely to improve the metric for the dimension over the first display option;
in response to the second determination, generating, by the insight validator, a validated insight into the requested metric based on the second determination;
updating the GUI based on the validated insight, wherein updating the GUI comprises updating, by the one or more computer processors, a placement of at least one of the plurality of selectable interface elements within the GUI based on the validated insight; and
transmitting, to the first user device, display instructions that, when executed, are configured to display the updated GUI comprising the at least one of the plurality of selectable interface elements.

2. The method of claim 1, further comprising
determining a third display option of the plurality of display options;
using the sampled data to:
calculate a third metric value for the third display option;
perform a third comparison by comparing the first metric value with the third metric value; and
based on the third comparison, perform a third determination that the third display option is unlikely to improve the metric for the dimension.

3. The method of claim 1, wherein the plurality of display options includes a user interface selection of the GUI, a parameter of the GUI, or a configuration of the GUI.

4. The method of claim 1, wherein the stored data set includes clickstream data.

5. The method of claim 1, wherein the dimension includes a device type, an experience type, a marketing code, a marketing channel, a member tier category, a destination name, a destination shorthand, a destination type, a destination attribution, a destination region, a country code, a country name, a brand group, a brand name, a line of business, a sort type, a traveler type, a travel group type, a room type, a search end, a trip duration, an adult count, a child count, an infant count, a party size, a room count, a filter count, a typeahead character count, a typeahead origin, a typeahead character.

6. The method of claim 1, wherein the metric includes a click count, an order count, a booking count, a conversion rate, or a view count, a percentage of clicks in top ten positions, a percentage of orders from top ten position, a quality of reviews for top ten positions, an inspection of detailed images for top ten positions, a number of bounces, a page duration, a duration of review for top ten positions.

7. The method of claim 1, wherein the first metric value includes a mean metric value calculated for each display option of the plurality of display options.

8. The method of claim 1, further comprising:
generating additional insights comprising results of additional determinations; and
ranking the additional insights according to a criterion.

9. The method of claim 8, further comprising displaying the ranked additional insights, wherein the ranked additional insights are displayed in an order based on the ranking, percentage improvement, or relative improvement.

10. The method of claim 9, wherein the ranked additional insights are displayed according to a natural language question.

11. The method of claim 1, further comprising:
receiving a selection of the first insight; and
implementing the first insight to optimize the GUI.

12. The method of claim 1, further comprising setting a configuration of the GUI to the second display option corresponding to the first insight.

13. The method of claim 1, wherein updating the GUI further comprises updating a placement of a feature within the GUI.

14. The method of claim 1, wherein updating the GUI comprises removing a feature from the GUI.

15. The method of claim 1, further comprising:
displaying a first feature in a prioritized location as compared to a second feature within a graphical user interface of the GUI; and
wherein updating the GUI further comprises moving the second feature into the prioritized location.

16. The method of claim 1, further comprising:
using the sampled data from the stored data set to calculate, by the insight generator, a third metric value for a third display option of the plurality of display options;
based on a comparison of the first metric value with the third metric value, perform a third determination by determining that the third display option is likely to improve the metric for the dimension;
generate, by the insight generator, a second insight comprising results of the third determination;
validate the second insight by using the unsampled data from the stored data set to:
calculate, by the insight validator, an updated third metric value for the third display option; and
based on a comparison of the updated first metric value and the updated third metric value, perform a fourth determination that the third display option results in an improvement in a metric value lower than a specified threshold;
wherein updating the GUI based on the validated insight excludes the third display option.

17. The system of claim 1, wherein the plurality of interface elements relates to travel-booking services.

18. The system of claim 1, wherein the plurality of interface elements comprises at least one of: an activity item, a lodging item, an advertisement, an amenities filter, a search result, or search service content.

19. A system comprising:
a computer-readable storage medium storing program instructions; and
one or more computer processors configured to execute the program instructions to cause the system to:
receiving, from a first user device, a request to optimize a graphical user interface (GUI) comprising a plurality of interface elements:
a first display option of a plurality of display options,
a dimension, and
a metric,
using sampled data from a stored data set to:
calculate, by an insight generator, a first metric value for the first display option; and
calculate, by the insight generator, a second metric value for a second display option of the plurality of display options;
based on a comparison of the first metric value with the second metric value, generate a first determination by determining that the second display option is likely to improve the metric for the dimension;
generate, by the insight generator, a first insight into the requested metric based on the first determination;
validate the first insight with unsampled data, wherein validating the first insight with the unsampled data comprises:
calculating, by an insight validator, an updated first metric value for the first display option;
calculating, by the insight validator, an updated second metric value for the second display option;
based on a comparison of the updated first metric value with the updated second metric value, generating a second determination that the second display option remains likely to improve the metric for the dimension; and
in response to the second determination, generating, by the insight validator, a validated insight comprising results of the second determination;
updating the GUI, based on the validated insight, wherein updating the GUI comprises updating a placement of at least one of the plurality of interface elements within the GUI, by the one or more computer processors, based on the validated insight; and
transmit, to the first user device, display instructions that, when executed, are configured to display the updated GUI.

20. The system of claim 19, wherein each of the plurality of interface elements is selectable.

* * * * *